(12) United States Patent
Gabriel

(10) Patent No.: US 9,785,714 B2
(45) Date of Patent: *Oct. 10, 2017

(54) METHOD AND/OR SYSTEM FOR SEARCHING NETWORK CONTENT

(71) Applicant: MLS TECHNOLOGIES PTY LTD., Keilor, Victoria (AU)

(72) Inventor: Robert Michael Gabriel, Melbourne (AU)

(73) Assignee: MLS TECHNOLOGIES PTY LTD., Victoria (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/180,108

(22) Filed: Jun. 13, 2016

(65) Prior Publication Data

US 2016/0283596 A1 Sep. 29, 2016

Related U.S. Application Data

(62) Division of application No. 14/523,897, filed on Oct. 26, 2014, now Pat. No. 9,396,266, which is a division
(Continued)

(30) Foreign Application Priority Data

Aug. 6, 2007 (AU) .............................. 2007904213

(51) Int. Cl.
*G06F 7/00* (2006.01)
*G06F 17/30* (2006.01)
(Continued)

(52) U.S. Cl.
CPC .... *G06F 17/30864* (2013.01); *G06F 3/04847* (2013.01); *G06F 17/3053* (2013.01); *H04L 67/02* (2013.01)

(58) Field of Classification Search
CPC ......... G06F 17/30864; G06F 17/30696; Y10S 707/99933
(Continued)

(56) References Cited

U.S. PATENT DOCUMENTS

2002/0169764 A1* 11/2002 Kincaid ............ G06F 17/30713
2006/0095840 A1* 5/2006 Weng ...................... G06F 17/24
715/255

(Continued)

*Primary Examiner* — Binh V Ho
(74) *Attorney, Agent, or Firm* — Soroker Agmon Nordman

(57) ABSTRACT

A method (200) for searching the Internet ($14_n$). The method (200) including the steps of: in response to a user search query, identifying at least one search origin ($12_n$) comprising an Internet resource ($12_n$) deemed of relevance; retrieving and reviewing the contents of the search origin ($12_n$) to identify the presence of one or more search avenues ($12_n$) stemming from the search origin ($12_n$), identifiable search avenues comprising: sites ($12_n$) which are ascertained by the search origin contents ($12_n$); submission fields presented by the search origin ($12_n$); and/or, dynamically generated content ($12_n$) retrieved from the search origin, and, perusing identified search avenues ($12_n$) to identify search results to be returned in response to the user search query.

20 Claims, 18 Drawing Sheets

Related U.S. Application Data of application No. 12/672,512, filed as application No. PCT/AU2008/001142 on Aug. 6, 2008, now Pat. No. 8,898,132.

(51) Int. Cl.
*G06F 3/0484* (2013.01)
*H04L 29/08* (2006.01)

(58) Field of Classification Search
USPC .......................................................... 707/706
See application file for complete search history.

(56) References Cited

U.S. PATENT DOCUMENTS

| | | | | |
|---|---|---|---|---|
| 2008/0072180 A1* | 3/2008 | Chevalier | ........... | G06F 17/3089 |
| | | | | 715/861 |
| 2012/0030226 A1* | 2/2012 | Holt | ................. | G06F 17/30672 |
| | | | | 707/766 |
| 2013/0046582 A1* | 2/2013 | Ramer | ................. | G06Q 10/101 |
| | | | | 705/7.32 |
| 2014/0114946 A1* | 4/2014 | Ture | ................. | G06F 17/30864 |
| | | | | 707/709 |

* cited by examiner

METHOD AND/OR SYSTEM FOR SEARCHING NETWORK CONTENT

RELATED APPLICATIONS

The present application claims priority under 35 U.S.C. 120 as a divisional of U.S. application Ser. No. 14/523,897 filed on Oct. 26, 2014, which is a divisional of U.S. application Ser. No. 12/672,512 filed on Feb. 18, 2010 and which has issued as U.S. Pat. No. 8,898,132. Application Ser. No. 12/672,512 claims priority from PCT/AU2008/001142 filed on Aug. 6, 2008 that claims priority from Australian patent application no. 2007904213 filed on Aug. 6, 2007. The disclosures of the above applications are incorporated herein by reference.

TECHNICAL FIELD

The present invention relates generally, to methods and/or systems for searching network content, and relates particularly, though not exclusively, to methods and/or systems for searching the Internet. More particularly, the present invention relates to a client-side Internet searching method and/or system that involves real-time web-crawling.

It will be convenient to hereinafter describe the invention in relation to a method and/or system for searching the Internet, however it should be appreciated that the present invention is not limited to that use only. The method and/or system of the present invention may also enable users to search other forms of network content without departing from the spirit and scope of the invention as hereinafter described. A suitable form of other network content may include, but is not limited to, company information and/or documents accessible to company staff via an intranet. Accordingly, throughout the ensuing description the expressions "content", "network content", "Internet content" or "web content" are intended to refer to any suitable form of information, documents and/or files that is/are accessible to a user via any suitable communications network.

BACKGROUND ART

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure herein.

Existing web search services include those of Google, Yahoo, and Live Search, to name but a few. Such search services (known as 'search engines') generally entail centralised databases (located server-side) which index billions of web-pages, so that users can search those databases for the information they desire through the use of keywords and/or operators.

Results to search queries submitted via such search engines are ordered using numerous criteria, including, for example, the concept of link popularity, whereby the number of other websites and/or web-pages that link to a given page is/are taken into consideration on the premise that good or desirable pages are linked to many others, to produce the "page rank". The page rank of linking pages and the number of links on those pages can also contribute to the page rank of the linked page, as described further in, for example, U.S. Pat. Nos. 6,285,999, 6,799,176, and 7,058,628. Because criteria such as link popularity is used by existing search engines in order to determine the relevancy and/or order of display of the search results obtained, it can be said that a form of subjective bias is introduced into the searching process. Hence, the search results obtained may not reflect the true results available, but instead those deemed to be relevant by a search engine's popularity algorithms, etc.

Index search engines are run on one or more server farms, usually consisting of thousands of low-cost commodity computers. It has been estimated that over 450,000 servers, racked up in clusters located in data centres around the world, are required to provide such a database indexed web search engine service. Despite such immense computing resources, the ranging "bot" or "spider" applications used to continuously crawl the Internet and update the database index cannot track updates to the web in 'real-time'.

Live Search (formerly Windows Live Search) is the name of Microsoft's web search engine. Despite its name, this service still relies on web-crawlers to build a centralised index which in effect provides a snapshot of what each portion of the Internet looked like the most recent time the web-crawler visited, and is thus not a true 'live' search. The Live Search search engine index is believed to include more than 5 billion documents, 400 million images and 3 million instant answers.

With the significant growth and changes occurring to content available on the Internet, the problem of trying to maintain a current index of the entire web is growing in magnitude. Current solutions involve substantial centralised infrastructure that attempt to store the entire contents of the Internet as an index. Even so, information is gathered from websites and indexed only intermittently. Hence, results indexed can become weeks or months old before being updated by a subsequent visit by a web-crawler.

A further problem with centralised database indexes is the proliferation of dynamically generated websites comprising active pages, such as eBay, among many others. An extremely high proportion of Internet content is now generated dynamically. The content of such sites can be highly volatile and can vary dramatically from one visit to the next. This only serves to exacerbate problems of currency of database indexes in respect of dynamically generated websites.

Meta-search engines such as Dogpile.com or OpenSearch.org are sometimes misconceived as being 'real-time' search engines. This is not the case at all. In fact, meta-search engines only pass through data representing a search query to other search engines utilising index databases in order to return search results obtained from those databases. Hence, meta-search engines do not actually physically perform a search at all, instead, they merely act as a display portal for a select few hosts and provide the same results of their hosts. In this way, meta-search engines create what is known as a virtual database, transparently integrating multiple database systems into a single view. Meta-search engines cannot search outside of the predetermined host(s) or host list (i.e. they only pass through results from a predetermined small list of hosts and provide only a single first stage layer of results from those predetermined sites). Meta-search engines are not able to adapt and learn how to search new hosts on the fly. Furthermore, as meta-search engines simply display results obtained from other index-type search engines, the results they display can also be biased by ranking and relevancy algorithms.

It is therefore an object of the present invention to provide an improved method and/or system for searching network content, preferably the Internet.

DISCLOSURE OF THE INVENTION

According to one aspect of the present invention there is provided a method of searching network content, the method comprising the steps of: in response to a user search query, identifying at least one search origin comprising a network resource deemed of relevance; retrieving and reviewing the contents of the search origin to identify the presence of one or more search avenues stemming from the search origin, identifiable search avenues comprising: network locations which are ascertained by the search origin contents; submission fields presented by the search origin; and/or, dynamically generated content retrieved from the search origin, and, perusing identified search avenues to identify search results to be returned in response to the user search query.

Preferably the network is the Internet, and the network content is web content and/or related web information, and wherein the network resource is an Internet resource. It is further preferred that the user search query is submitted by way of a suitable graphical user interface. In a practical preferred embodiment, the graphical user interface is a web-browser, and the search query is submitted by way of a software application embedded within and/or provided as a plug-in for the web-browser graphical user interface. Preferably the software application is a client-side application.

According to a further aspect of the present invention there is provided a graphical user interface application for searching network content, the graphical user interface application comprising: code for identifying, in response to a user search query, at least one search origin comprising a network resource deemed of relevance; code for acquiring and reviewing the contents of the search origin to identify the presence of one or more search avenues stemming from the search origin, identifiable search avenues comprising: network locations which are ascertained by the search origin contents; submission fields presented by the search origin; and/or, dynamically generated content retrieved from the search origin, and, code for perusing identified search avenues to identify search results to be returned in response to the user search query.

Preferably the network is the Internet, and the network content is web content and/or related web information, and wherein the network resource is an Internet resource. In a practical preferred embodiment, the graphical user interface application is a web-browser application, and the search query is submitted by way of a software graphical user interface application embedded within and/or provided as a plug-in for the web-browser graphical user interface. Preferably the software graphical user interface application is a client-side application.

According to yet a further aspect of the present invention there is provided a computer program element comprising computer program code means to make a computer execute a procedure for searching the internet, the computer program element comprising: computer program code means for identifying, in response to a user search query, at least one search origin comprising an internet resource deemed of relevance; computer program code means for acquiring and reviewing the contents of the search origin to identify the presence of one or more search avenues stemming from the search origin, identifiable search avenues comprising: sites which are ascertained by the search origin contents; submission fields presented by the search origin; and/or, dynamically generated content acquired from the search origin, and, computer program code means for perusing identified search avenues to identify search results to be returned in response to the user search query.

The present invention thus provides for content associated with a relevant search origin to be perused or crawled substantially in real-time at the time a user enters a search query.

The search origin may be identified by the graphical user interface application querying a database indexed search engine and utilising one or more results obtained therefrom as the search origin. Additionally or alternatively, the search origin may be identified by accepting a user input of a search origin from which the user wishes the search to commence. More than one search origin may be identified and have associated content crawled substantially in real-time in accordance with the present invention in order to ascertain search results.

Where an identified search avenue comprises a submission field such as a search field or the like presented by the search origin, the graphical user interface application is preferably operable to actuate the submit box by entering an appropriate query and initiating a submission. The appropriate query may comprise a subset of keywords of the user search query. The graphical user interface application is preferably further operable to identify additional keywords relevant to the user search query, and to enter such additional keywords into identified submit boxes. The graphical user interface application preferably captures relevant content returned in response to the submission for ranking and presentation as search results in response to the user query.

The identifiable search avenues may further comprise sites which link to the search origin.

In preferred embodiments search avenues may be prioritised and/or disregarded based on search avenue relevance, etc. A relevance of each search avenue may be determined by look-up of relevancy and/or word weight tables, etc.

The search results are preferably returned to the user in order of relevancy. Relevancy of each search result may be determined in accordance with known techniques such as keyword hit count, etc.

In preferred embodiments of the invention, the graphical user interface application is operable to display a live state of search results as crawling continues. For example, a search results list may be refreshed at regular increments, such as, for example, at least every 2.5 seconds, as continued live crawling yields additional search results of sufficient relevance for inclusion in returned results.

In still further preferred embodiments of the invention, the graphical user interface application is operable to retrieve content from websites deemed sufficiently relevant for inclusion in the returned search results, and to display a synopsis and/or site summary of each returned site for review by the user. In some embodiments such synopsis may be retrieved for each site included in the finalised search results only once live crawling is terminated.

In still further preferred embodiments, where it is discovered by the live crawling that a search avenue or search origin comprises a link which is no longer operable, the non-operability of the link may be communicated to the user.

In further embodiments of the invention the graphical user interface application, in addition to presenting identified search results to the user, may communicate such results to a centralised repository for inclusion. Such embodiments of the invention thus envisage a client-generated repository which gathers the results of web crawling conducted by a plurality of, and potentially millions of, client applications. Such embodiments may thus provide for substantially greater overall web crawling power and permit a centralised repository to be maintained in a state substantially more representative of the real-time state of the Internet.

According to yet a further aspect of the present invention there is provided a method for centrally storing internet search result information, the method comprising: receiving, from a plurality of client graphical user interface applications, search information characterising searches carried out by the plurality of client graphical user interface applications; and, aggregating search result information received from said plurality of client applications into a central repository of internet search result information for future referral and/or retrieval.

According to yet a further aspect of the present invention there is provided a computer program element comprising computer program code means to make a computer execute a procedure for centrally storing internet search result information, the computer program element comprising: computer program code means for receiving, from a plurality of client applications, search result information characterising searches carried out by the plurality of client graphical user interface applications; and, computer program code means for aggregating search result information received from said plurality of client graphical user interface applications into a central repository of internet search result information for future referral and/or retrieval.

The client graphical user interface applications are preferably operable to undertake a check as to whether a particular search origin or search avenue has been previously crawled, for example by referring to search histories cached by the client graphical user interface application and/or, more preferably, to querying of the centralised database for search result information relevant to a search query input to the client graphical user interface application. Such embodiments enable previous crawls to be leveraged to improve efficiency of subsequent crawls of the same site.

BRIEF DESCRIPTION OF THE DRAWINGS

In order that the invention may be more clearly understood and put into practical effect there shall now be described in detail preferred constructions of a method and/or system for searching network content in accordance with the invention. The ensuing description is given by way of non-limitative example only and is with reference to the accompanying drawings, wherein.

MODES FOR CARRYING OUT THE INVENTION

Figure 1:
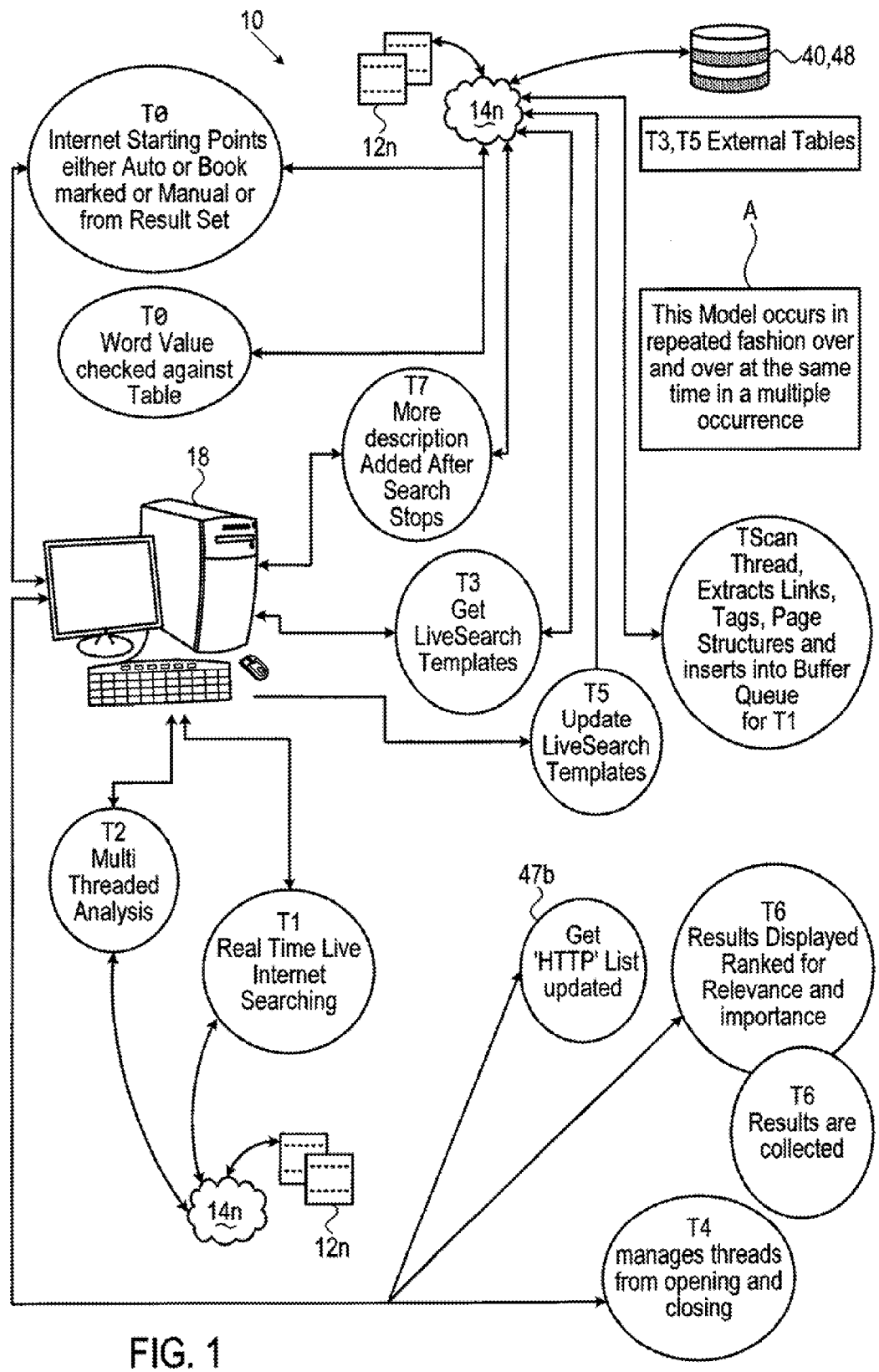
FIG. 1 is a block diagram of a system for searching network content made in accordance with a preferred embodiment of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilising terms such as "processing", "computing", "calculating", "determining", and/or "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialised apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In FIG. 1 there is shown a first preferred embodiment of a system 10 for searching content $12_n$ available via a suitable communications network $14_n$, for example, web content $12_n$ available via the Internet $14_n$ as shown. Although the present invention will hereinafter be described with reference to systems and/or methods for searching the Internet $14_n$, it will be appreciated that the present invention is not limited to that use only.

In FIG. 1 it can be seen that system 10 includes a client application (shown in block or schematic form only) that enables web content $12_n$ to be searched via the Internet $14_n$. In accordance with a preferred embodiment, the client application of system 10 is a plug-in application that can be run through a suitable web-browser (not shown), as for example, Internet Explorer or Mozilla Firefox, and which appears as a normal website once the plug-in is operating (see, for example, FIGS. 7a to 7e—which will be described in further detail below).

The client application provides a 'live search engine' graphical user interface 16 (again, see FIGS. 7a to 7e) which has an array of components that may be ported out to many different types of applications and/or platforms. A commonly used component is an ActiveX module (not shown) which can be readily embedded into any webpage or website $12_n$. ActiveX modules make it easy to transport the live search engine facility of the present invention to a large variety of computer applications, and are easily imported into many software applications. Further, such an embodiment of the invention allows use of normal every day computers or portable computing devices such as mobile telephones and personal digital assistants (collectively referred to as item '18' in the FIGS. 1 to 6i).

Although described as being a plug-in client application for a web-browser, it will be appreciated that the 'live search engine' graphical user interface 16 (hereinafter simply referred to as 'GUI 16') of the present invention may also be provided by way of being packaged within open source web-browsers such as, for example, the well known Mozilla Firefox or Gecko web-browsers. The present invention should therefore not be construed as limited to the specific example provided.

Whether embodied as a plug-in application for a web-browser, or embedded within same, the live search engine GUI 16 of system 10 may initially appear similar to existing search engine's (not shown), however the present embodiment of the invention comprises a number of substantial differentiating features, of which the following are noted (but are not limited thereto).

First, the present embodiment provides for the generation of search results at least partially from an actual 'live' or 'real-time' search conducted at the time of entry of a search query by a user (not shown). Such searching of website(s) $12_n$ in real-time, within perhaps a few seconds of the search query, allows for retrieval of search results that are currently available and accurate up to the moment, without referring to an index for possibly dated results. For example, if the same search is conducted a few moments later and newer results have appeared on searched sites, those new results will be retrieved and shown in the new search results.

Second, the present embodiment provides for searching of dynamically created sites $12_n$, also referred to as the "invisible web". That is, the search coverage of the present embodiment includes querying websites $12_n$ that are dynamically created, such as eBay, and the like. This dramatically increases the thoroughness of searching these sites 12 by undertaking keyword of interest queries within these sites $12_n$.

Third, the performance of such searching and collation of search results is in this embodiment controlled by the user's own computing device 18. That is, searching processing is run by the end user's (client-side) own resources (computer 18, broadband connection $14_n$, etc), so as to avoid the cost of enormous infrastructure as compared and required by the existing major search engines. Providing such functionality on the client-side allows provision to the user of control of the actual search performed from their computer 18, and/or the manner in which search results are ranked for relevance, and so on. The centralised architecture relied upon by the major search engines does not allow such client-side search customisation and control.

The present embodiment of the invention further utilises community based searching. As searches are conducted, results are retrieved from the searching origin(s) initially. As the search continues from these starting points, the web-crawler, or spider, of system 10 looks for results relevant to the keyword of those initial website(s) $12_n$ (which is represented by, for example, block 25 in FIG. 3). Therefore, fringing websites $12_n$ that are associated with the initial starting points or searching origin(s) are also considered by the spider and searched accordingly. In turn, any website(s) $12_n$ fringing those fringing websites $12_n$ may be searched, and so on. This approach recognises that often websites $12_n$ are interrelated and that each related site $12_n$ is likely to have information relevant to the original searching origin. This iterative crawling process of the present invention can retrieve results that are of high relevance to the initial starting website 12 and enables searching of multiple resources within the community of sites $12_n$ relevant to the topic of interest.

Figure 2:
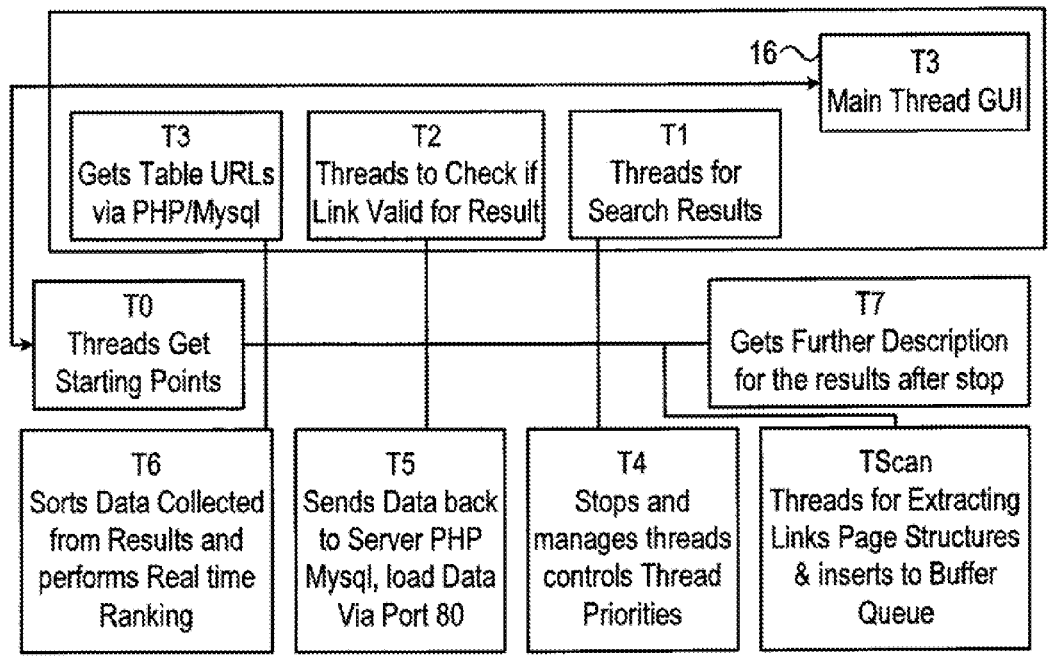
FIG. 2 is a schematic diagram showing in simple terms how the various software modules or 'threads' of the embodiment of FIG. 1 interact with one another when a search is requested.

In FIGS. 1 & 2, it can be seen that the preceding (and additional) functionality of system 10 is effected in the present embodiment by way of a plurality of software/hardware modules or 'threads' which will now be discussed in more detail.

Referring particularly to the schematic representation of FIG. 2, it can be seen that the live crawler component of the live search engine (GUI 16) of system 10 utilises or includes eight specific main threads (referred to as 'T0' to 'T7') that are conducted simultaneously and/or in conjunction with a plurality of additional components or threads (including, for example, thread 'TScan' as shown) conducting searches simultaneously throughout the Internet $14_n$ in real-time.

Figure 3:
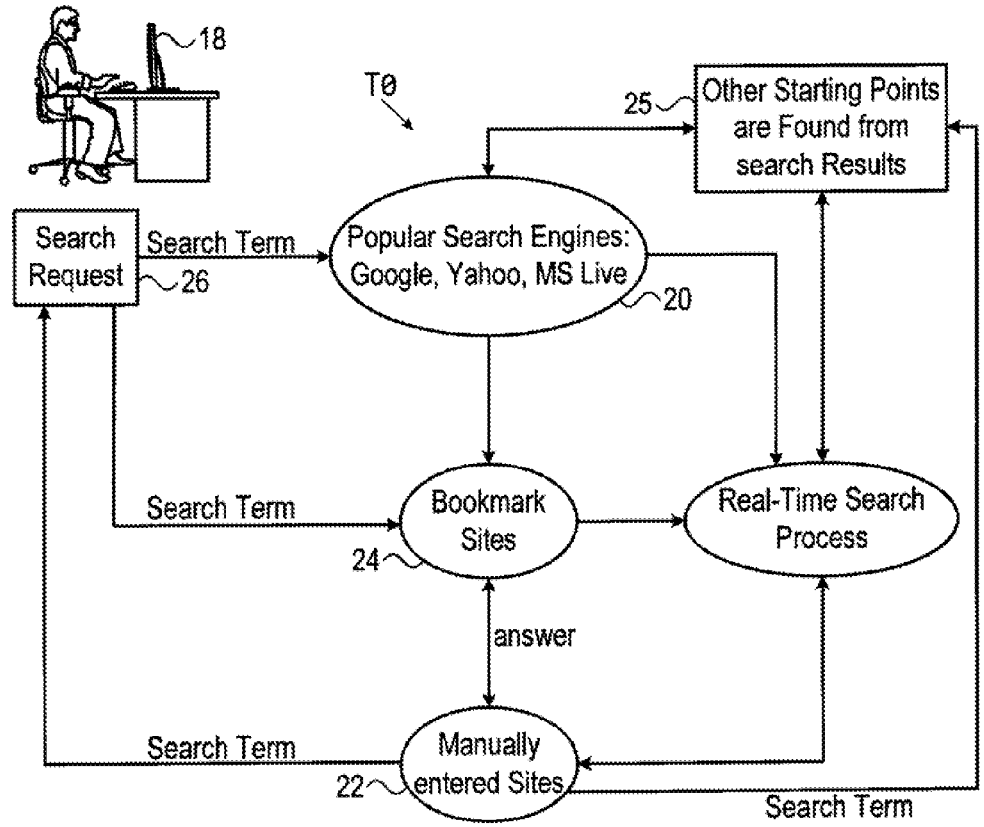
FIG. 3 is a block diagram which illustrates the manner in which search origins may be derived in accordance with the embodiment of FIG. 1.
Figure 4A:
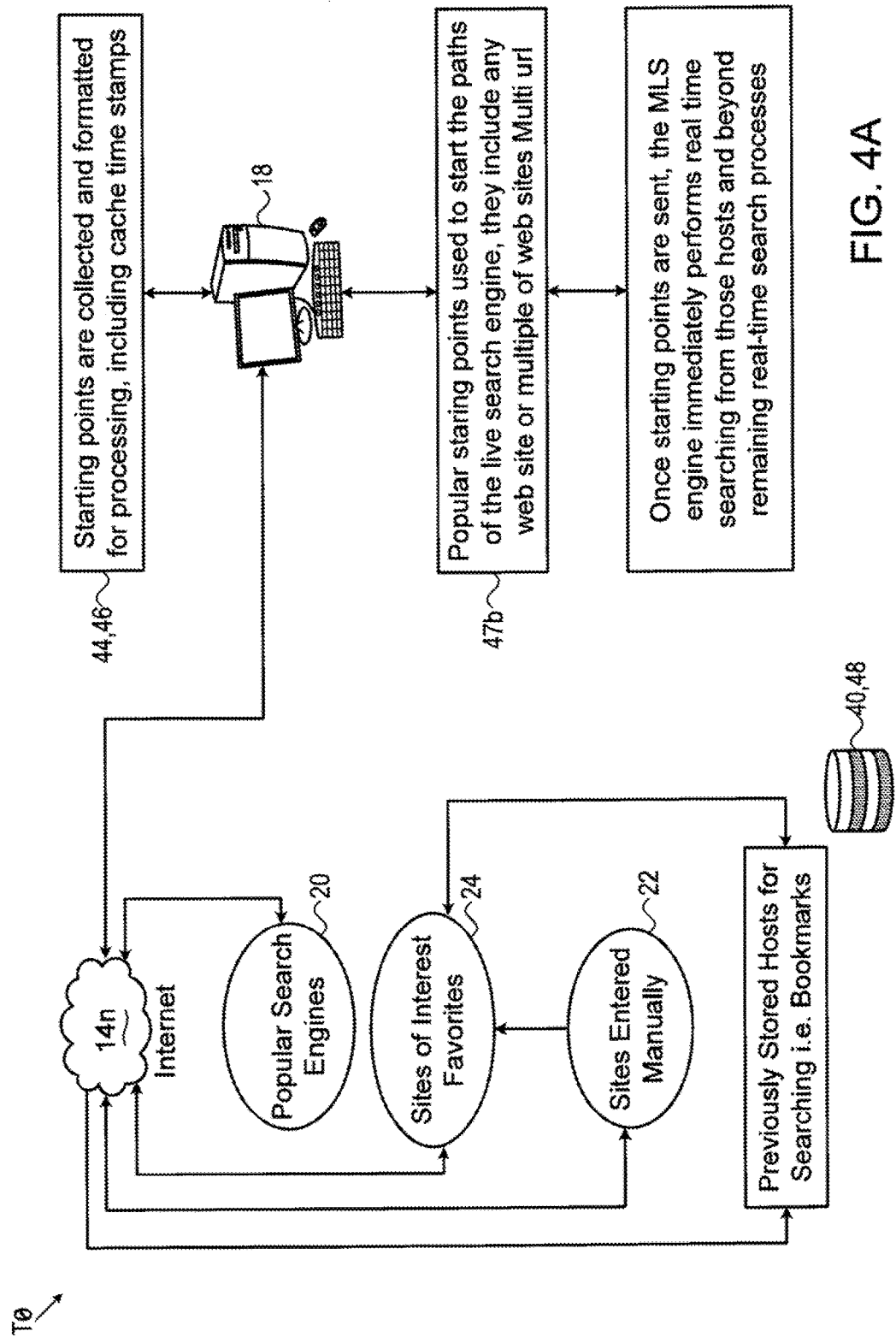
FIG. 4a is block diagram which provides a more detailed overview of the way in which search origins may be derived in accordance with the T0 thread of the embodiment of FIG. 1.

To commence any search, the client application of system 10 of the present embodiment requires one or more 'starting points' or 'searching origin(s)', to serve as the gateway to conduct a real-time search. As illustrated in FIGS. 3 & 4a, the search origin can be derived (using Thread 'T0'— described below) from one or more index databases such as Google or Yahoo (referred to as 'popular search engines 20' in FIGS. 3 & 4a), and/or from any other specific website(s) $12_n$ of interest to a user such as news sites, online marketplaces, or the like (referred to as 'manually entered sites 22').

A user can nominate one or more website(s) $12_n$ (e.g. can manually enter sites 22) which are desired to serve as the default search origin(s) for every search that is conducted.

Alternatively the user can customise the search origin definition further by changing or adding more websites $12_n$, based on the keyword or topic of interest for any particular search, enabling the user to control searching to cover and return greater or lesser quantities of information. That is, the present embodiment provides the user with substantial control of searching scope and operation, which presents the opportunity for the user to enhance the quality of results rather than obtaining generic or mass results of lower relevance.

The present embodiment further provides a bookmark feature (see 'bookmark sites 24' or 'sites of interest favourites 24' in FIGS. 3 & 4*a*) which enables the user to choose and save predetermined websites $12_n$ of interest as their favourite bookmarks to define appropriate searching origins for future use.

Another choice (see, for example, FIG. 4*b*—which will be described in further detail below) may be to provide an "auto suggest", or 'default' setting option, for when a user is not aware of a specific site(s) $12_n$ suitable as a search origin for the particular search query (keyword) they desire. In this event the user may simply be asked to pre-select a major search engine, or a combination of search engines, as a default to retrieve say up to 10 results automatically from those indexed database(s). Those results could then be used as the starting points or search origins for the live web-crawlers of the present embodiment to start from and search the Internet $14_n$ in real-time.

The exemplary live search engine GUI's 16 shown in FIGS. 7*a* to 7*e*, demonstrate a number of examples of the way in which a user may customise or personalise their searching experience in accordance with system 10 the present invention. More particularly, in FIG. 7*a* it can be seen that in order to perform a search a 'search request' field 26 is provided within GUI 16 for entry of desired search terms. Beside this search request field 26 is a 'search' button 28 for initiating the searching process. Hence, a basic search may be performed in a conventional manner (only in terms of query entry and search submission, i.e. not in terms of the actual search process) by simply entering appropriate search terms into the search request field 26 and clicking on the search button 28.

Figure 7A:
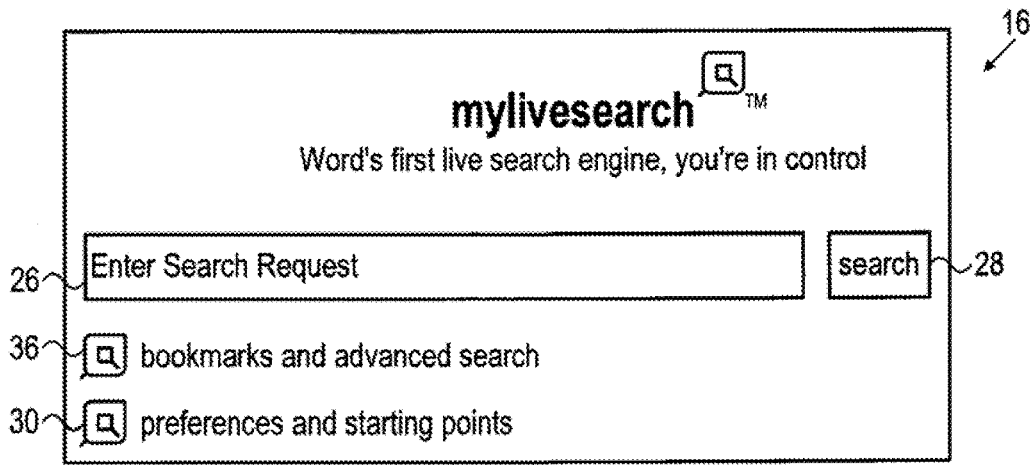
FIG. 7a to 7e are exemplary graphical user interfaces illustrating preferred aspects, and/or various preferred modes of operation, of the method and/or system for searching network content shown in FIGS. 1 to 6i; and, FIG. 8 is a block diagram of a method and/or system for searching network content made in accordance with a further preferred embodiment of the present invention.
Figure 7B:
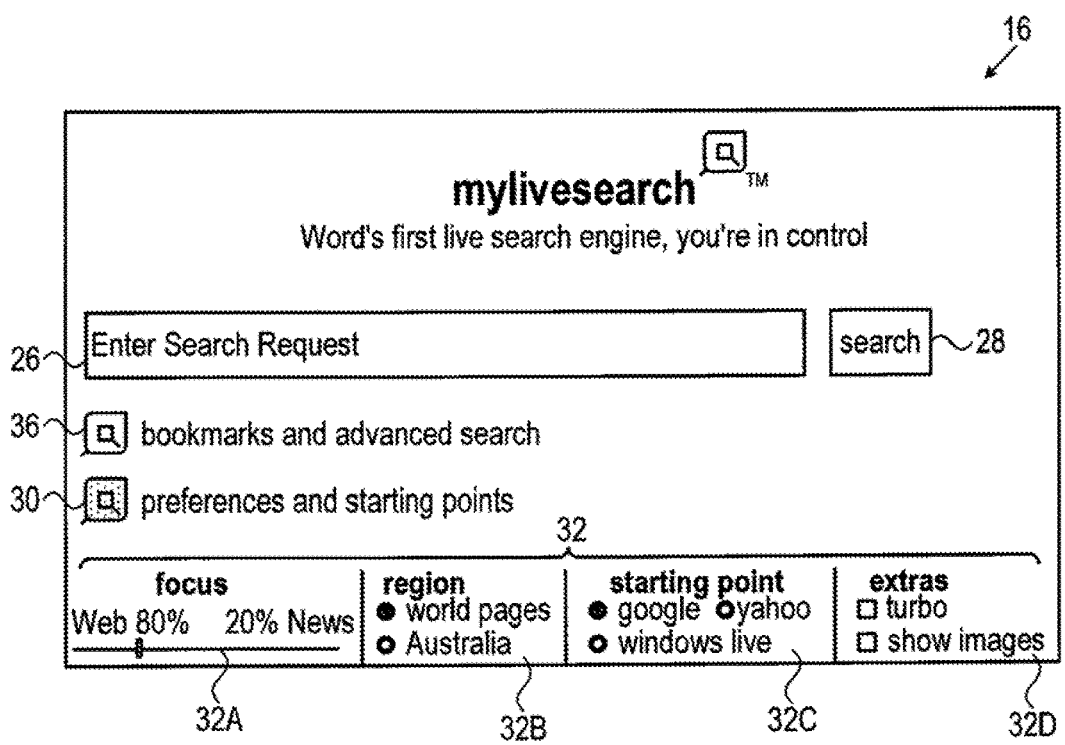
Figure 7C:
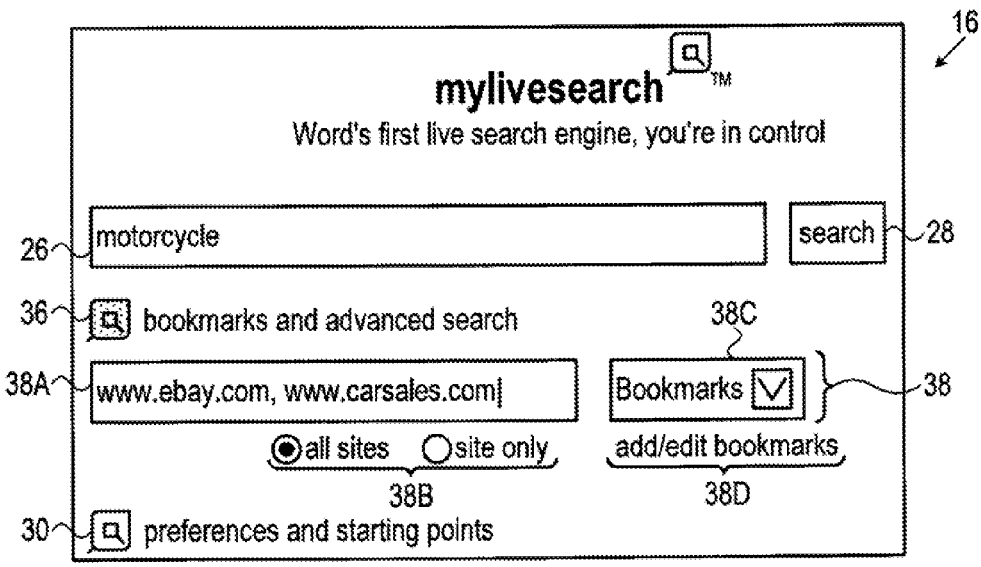
Figure 7D:
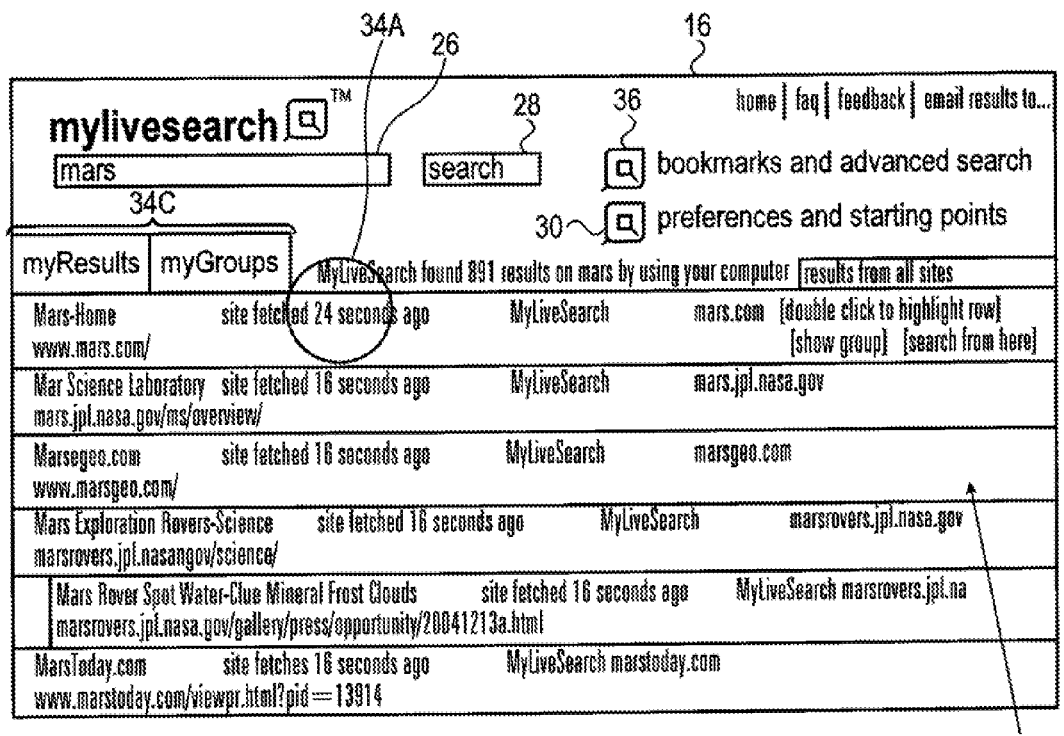
Figure 7E:
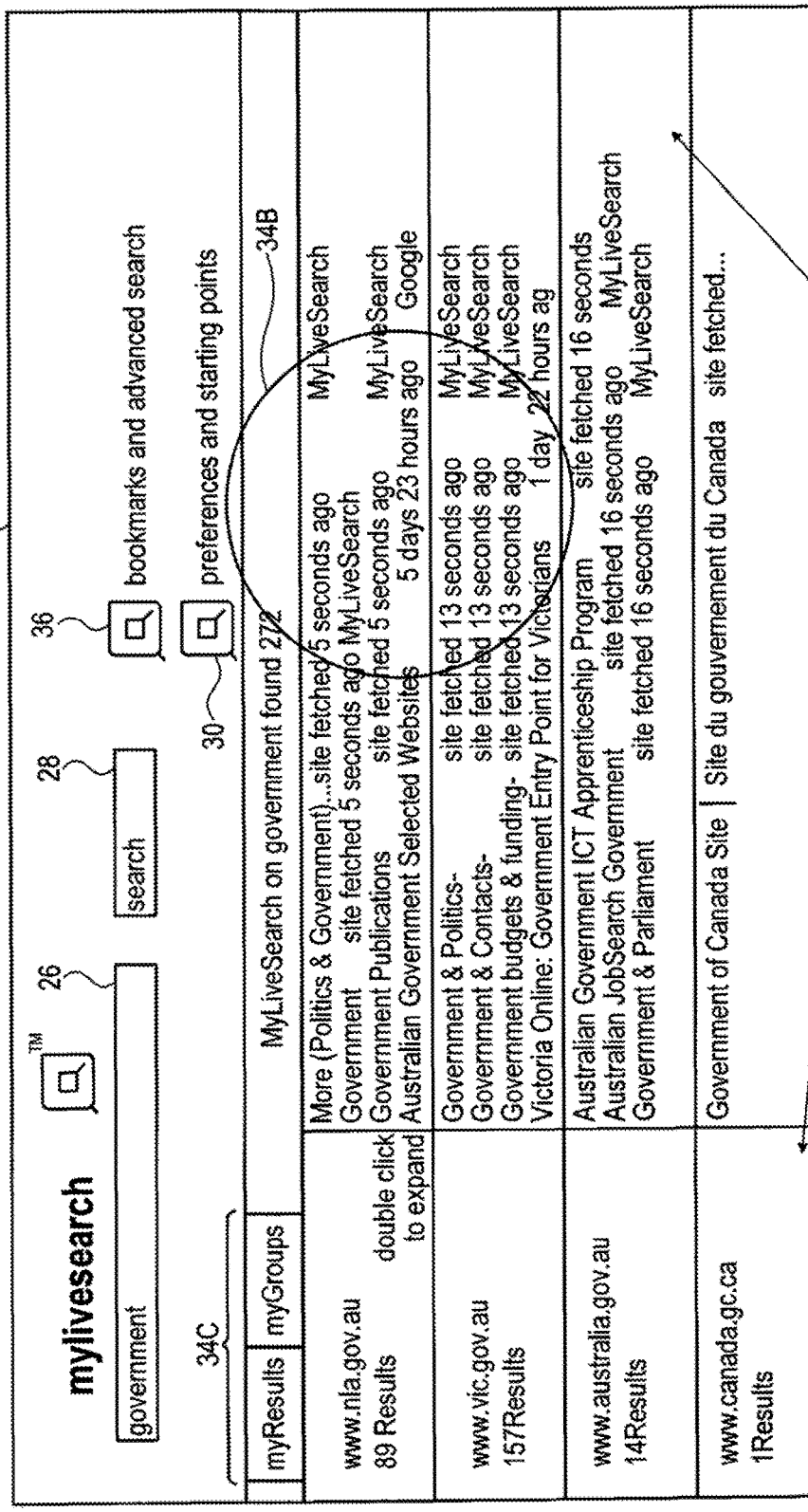

However, referring particularly to FIGS. 7*b* & 7*e*, should a user wish to customise their searching experience they may do so in a number of ways. For example, a user may alter their search preferences or default starting points by clicking on a 'preferences and starting points' button 30. In this way, a 'preferences and starting points tool bar' 32 may appear (e.g. may expand and collapse when clicked by a pointing device, or hovered there-over, etc) in order to present a user with a number of options that they can select as desired to customise their searching process. For example, the preferences and starting points tool bar 32 may include: a 'focus' slide bar 32*a* to, for example, enable a user to determine how much of their search results are to be web or news based—by, for example, sliding bar 32*a* left and right as desired; a 'region' selection area 32*b* to, for example, enable a user to select whether their search results are to be limited to a specific region, or are to be world-wide, etc; a 'starting points' selection area 32*c* to, for example, enable a user to select one or more default index search engine starting points; and/or, an 'extras' selection area 32*d* to, for example, enable a user to select whether they would like to perform a quick or 'turbo' search, and/or whether they would like to display images within their search results display area 34 (see, for example, FIG. 7*d*).

Within exemplary GUI's 16 shown in FIGS. 7*a* to 7*e*, it can also be seen that a 'bookmarks and advanced search' button 36 may be provided so that users can customise other aspects of their searching experience. In this way, a 'bookmarks and advanced search' selection area 38 may appear (e.g. may expand and collapse when clicked by a pointing device, or hovered there-over, etc) in order to present a user with a number of options that they can use as desired to customise their searching process. For example, the bookmarks and advanced search selection area 38 may include: a 'site(s) entry' field 38*a* to, for example, enable users to manually insert website(s) $12_n$ of interest to them to be searched alone (as an advanced search), or as part of their wider search (again, as an advanced search), or to be saved as 'favourite sites' for future use (e.g. as bookmarks 24); an 'all sites/site only' selection area 38*b* to, for example, enable a user to select whether only their inserted website(s) $12_n$ are to be searched, or whether their inserted websites $12_n$ are to be searched as part of a wider search process; and/or, a 'drop-down menu' 38*c* and associated 'add/edit bookmark' selection area 38*d* to, for example, enable users to add and edit their bookmarks (or favourite website(s) $12_n$ starting points, etc) as desired. Hence, user's may manually insert website(s) $12_n$ of interest to them utilising the bookmarks and advanced search selection area 38 of GUI 16, and then save them as "favourites" to serve as starting points for the web-crawlers of the live search engine facility of the present invention to conduct future searches of the Internet $14_n$ (in real-time).

Although reference has been made to exemplary GUI's 16 in order to provide a better understanding of preferred aspects of the invention, it will be appreciated that any suitable GUI could be used in accordance with the present invention. Similarly, it should be understood that the content and features shown displayed within GUI's 16 of FIGS. 7*a* to 7*e* only represents an example of the type of information and features that can be presented to user's of system 10. Accordingly, the present invention should not be construed as limited to any of the specific examples provided.

Furthermore, in various drawings accompanying the present application, more particularly the exemplary GUI's 16 shown in FIGS. 7*a* to 7*e*, various trade marks and logos are shown for illustrative purposes only. It will be appreciated that any reference to the trade mark "MyLiveSearch", or its abbreviation "MLS", is simply intended to refer to the system being a 'live search engine' facility. Hence, where the term "MLS" is used within the drawings, same should be interpreted as meaning "live search" or "live search engine facility" as hereinbefore described.

In accordance with a further preferred aspect of the present invention, yet another source of searching origins could be provided by way of a centralised repository 40 (or database(s)—see FIG. 4*a*) which indexes search queries and results from previous users. This would allow a single live searching application to leverage searches conducted by other user's, for example by utilising a ranking of searching origins. Thus, when a request is provided to the live search facility from either a web-page $12_n$ request, or application request, the facility could review the request, identify appropriate search origins, and make decisions on what path to take to start the real-time search process of the present invention.

Once appropriate searching origins are identified, the live search engine facility could access the website(s) $12_n$, or Internet $14_n$ resource, and identify search avenues which are presented, by making numerous inquiries and requests seeking any possible search results that are required to fulfil the search request made.

As previously mentioned, at the core of the live search engine facility of the present invention is a series of complex multi-threaded tools (threads) that utilise an end user's computer 18 and Internet connection $14_n$ in order to carry out a 'live' search of the Internet $14_n$ on the fly (e.g. in real-time).

One thread of this tool is a major thread crawler (referred to as 'TScan') which downloads the source code of the website(s) $12_n$ currently being searched in a text format. From this information, all alinks and file types (e.g. jpegs, videos, mp3, etc) on the page(s) (website(s) $12_n$) are dissected, for threads 'T1' and 'T2' (discussed below) to investigate further, with the assistance of the TScan thread to open more results as they are found.

The term 'alinks' refers to relevant results suitable for ranking and returning as search results. The TScan thread, or the major thread crawler, is capable of running multiple instances of itself dependent on available system resources and how many components are running at any one time. As alinks are found through thread T1, they are concurrently passed onto thread TScan as a priority ahead of any work the TScan thread is doing currently, e.g. downloading website(s) $12_n$ source code, etc. By sharing the results as they are found to be further explored by threads T1, T2, and TScan, the overall live search process becomes quicker and more efficient on resources.

Figure 4B:
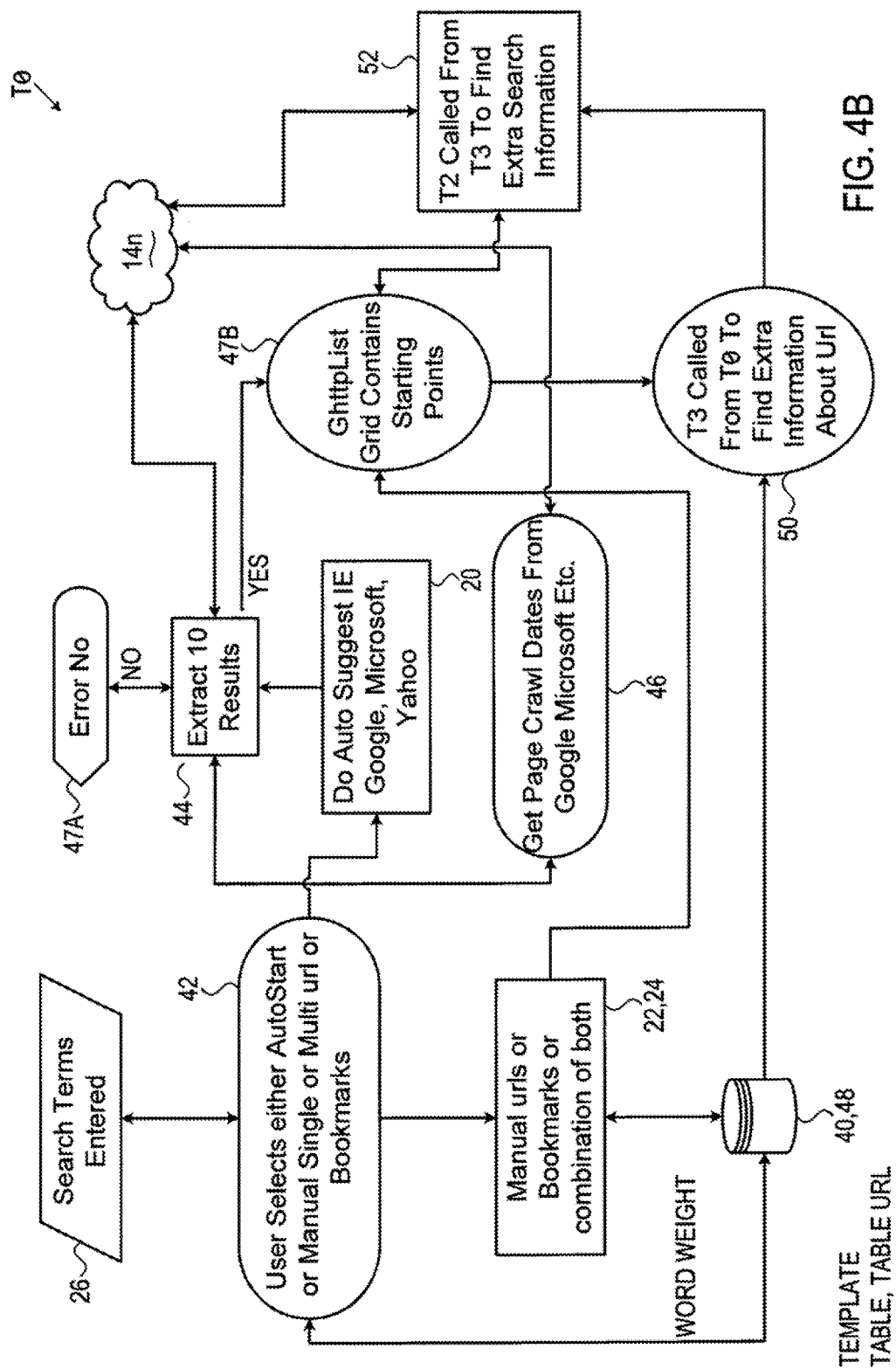
FIG. 4b is a further block diagram which illustrates how search origins may be derived in accordance with the T0 thread of the embodiment shown in FIG. 1, this time showing a preferred derivation process in greater detail.

The T0 thread is illustrated by way of FIGS. 3 to 4b. As already briefly discussed above, the T0 thread is responsible for establishing which starting points will be used as search origins, for other components (e.g. threads) of system 10 to use to conduct further search processes and queries.

In the preferred embodiment shown in FIG. 4b, starting points may be derived via two methods which are chosen by the user, either by the 'auto suggest' option, or the 'bookmark' option (see block 42 in FIG. 4b). If the 'auto suggest' option is selected, then T0 automatically queries the default index database(s) as selected by the user (block 20) and retrieves say up to 10 results from those database(s) (see block 44) to be used and/or displayed within a results display area 34 of a suitable GUI 16 (see, for example, FIGS. 7d & 7e). If these results are cached by the default database with an associated time stamp, then this time stamp is also captured (block 46) and displayed next to each result that is retrieved from that database in order to indicate the vintage of the result (see, for example, item 34a within results display area 34 of GUI 16 of FIG. 7d).

If an error results when trying to obtain the predetermined number of search results from the index database (e.g. Google, etc) to be used as starting points by the live search engine facility of system 10 (at block 44), then an error message may be returned to the live search engine facility, and such could be displayed to a user within GUI 16 (see block 47a). If no errors are returned, and hence the predetermined number of results are correctly obtained from the index database (at block 44), then those results are utilised as the starting site(s) $12_n$ or search origin (see block 47b—described in further detail below). Alternatively, if the 'bookmark' (or manual entry) option is selected (block 22,24), then T0 does not submit a query to any default database to retrieve results, but instead loads up all relative websites/URL's ($12_n$) that are located in the bookmark option. Such bookmarks could include entertainment, finance, user video sites, and the like, and the relevant URL's attached to each bookmark. Each such bookmark is then utilised as the starting site(s) $12_n$ or search origin (again, see block 47b—described below).

Word weight relevancy checks may also be performed (see block 48) in order to determine which terms within a search query are to be given more weight or significance than others. Prior to the web-crawlers of system 10 searching for the keyword (discussed further below), an established server or database (both collectively referred to by block 48—which is also referred to as block 40 below for the purpose of describing how previous indexed search strategies can be accessed if need be in order to improve a future search—it will be appreciated that these facilities could be the same or separate facilities) may be queried for the relevancy and word weight from its established tables, to identify which part of a keyword query is more important for ranking purposes, and/or to determine a display order of results within the results display area 34 of a GUI 16 (see FIG. 7d). For example, if "Honda car" was the keyword submitted by a user, then the word weight relevancy would tell the web-crawlers of the present invention that the word "Honda" is more important than the word "car", but that the two words combined are worth more than either individual word.

The TScan thread is called from thread T0 once a user commences a search. In FIG. 4b it can be seen that once executed, thread T0 calls thread 'T3' (see block 50), which is the thread (T3) that calls the established related (backend) server (block 40,48) for URL Template information and Table URL information, as discussed further in the following. Thus, should the 'auto suggest' method be chosen (block 20), T3 is called (at block 50) to check the backend server (block 40,48) to assess whether any improvements or direction management can be added to provide additional search avenues. For example, sites $12_n$ often have search boxes embedded within them for searching (Template URL). If a Template is already known from the template table of the backend server (block 40,48), this indicates that it is already known how to efficiently search the site $12_n$ and the Template describing this can be followed. Otherwise, a first principles search approach is adopted. Also, sites $12_n$ may have information that has been crawled recently, which will be checked against keywords (Table URL) to provide extra information that may assist in the efficiency of searching.

T0 also calls a further thread called 'T-ini' (not shown), which is a thread that checks how old an index is (i.e. how old the cached data is) from a queried centralised database such as Google or Microsoft Live. The T-ini thread uses this time stamp (or cache) information to show a user a comparison between the last time the centralised index search engine actually crawled a particular site $12_n$, verus the time at which the results were fetched by the live search client application of the present invention (see, for example, item 34b within results display area 34 of GUI 16 of FIG. 7e, which shows the time stamp information for the live search engine facility of the present invention, versus Google's time stamp or cached information). This information can be important to users when searching for time-sensitive information or when searching rapidly varying sites $12_n$, such a dynamically generated content (e.g. sites like eBay, Facebook, etc).

In essence, the main role of thread T0 is to retrieve search origins for further processing by the live search engine facility of the present invention. Importantly, each search origin serves merely as a starting point for the web-crawlers of the present embodiment. Starting points can be derived as mentioned earlier and/or from a multitude of other sources (not shown), all of which are capable of providing the facility of the present embodiment with a new way of finding Internet $14_n$ information in real-time.

As already described, in FIG. 4b it can be seen that if in thread T0, the search origin(s) are manually entered or obtained from the bookmarks selection process (block 22,24), then thread T3 is also called (at block 50), to investigate whether the backend server (block 40,48) already holds appropriate search results which can be passed back to the client application, to improve search speed, etc. Once a website $12_n$ or URL is selected as an appropriate search origin (via blocks 20 or 22,24), the appropriate information relating thereto is placed on a 'GhttpList' (block 47b). This list acts as the source from which multiple other web-crawlers of the present embodiment commence work on downloading respective such sites $12_n$ so as to perform a live, or real-time, search of each site $12_n$. When thread T0 calls thread T3 (at block 50), this in-turn results in thread T3 calling thread T2 (see block 52). As discussed in more detail below, thread T2 provides further functionality in opening pages that might also contain extra information that can be fed to the web-crawlers of the present embodiment by way of the GhttpList (block 47b) of search origins.

Another thread of the present embodiment is thread T1. T1 searches website(s) $12_n$ set out on the GhttpList (47b), retrieving all the relevant information that is associated to the keyword query entered by the user, through many methods, including, but not limited to: searching alinks; searching "submit" boxes on site(s) $12_n$ by submitting keyword queries; searching using a web-browser 'search box', such as that provided by Microsoft's Internet Explorer version 7; searching the source code of the site $12_n$ (text format); searching image (e.g. jpeg's, etc) descriptions and hints; searching the Table URL (from the backend server table (40,48), via the T3 thread); and/or, searching Templates (from the backend server template table (40,48), via the T3 thread).

As noted previously, alinks are the links found on a website(s) 12 that are being crawled in real-time. These are found by looking at the link to see if the keyword is located within the alink, or is part of that alink, i.e. http://heul/keyword/tth/dd. Once found, the alink is treated as a direct result which is passed onto thread 'T6' to be ranked and displayed within the live search engine facility GUI 16—which will be discussed further in the following. Then, the alink is passed on into a queue as a priority to the TScan thread to download, and also to thread T2 to be opened and explored further for anymore relevant keywords, or onward links, etc.

Searching of a "submit box" is conducted by parsing the website(s) $12_n$ in question in order to automatically identify the presence of a "submit box". Once a "submit box" is found, the keyword is placed within this field automatically by thread T1, and is submitted to the site $12_n$ in order to return results. If results are retrieved through this method, they appear as alinks and are then treated as mentioned above in the alink description.

Source code is searched by searching the website(s) $12_n$ in question at the source code level in a plain text format. When searching for the keyword within the source code, once found the page in question is treated as a result and returned for ranking and display (by thread T6—see below), as necessary.

Thus, the T1 thread is called from the TScan thread, or major thread crawler, on a download event, so that every time the TScan thread downloads a page $12_n$ it will pass a call to the T1 thread. Once executed, the T1 thread also executes the T2 thread at times, to allow extra search avenues to be followed as discussed further in the following.

The main role of the T1 thread is thus to explore websites $12_n$ that may contain search boxes or submit buttons, so as to be able to submit queries to submit fields. Additional pages $12_n$ opened via such queries allow further alinks to be identified. In turn, such results can be passed back to the backend server (40,48) via thread 'T5' (discussed further in the following) to assist future T3 thread requests (also discussed further in the following).

A further thread of the client application of the present embodiment shown in FIG. 1, is thread T2. T2 receives results retrieved by thread T1 and thread T3, to be explored/opened further. These results are also put into a queue to be given to the TScan thread to explore further, prioritised ahead of other results the TScan thread is generally exploring. Thread T2 is called from threads T3 and T1. Thread T2 executes by inserting URLs of interest as search origins into the GhttpList grid (see block 47b). The T2 thread is thus used to further explore alinks that may contain relevant information to the search terms. T2 is also used as a secondary web-crawler to assist the alinks that are being found by thread T0 and passed to thread T3 and T1, which in-turn call on thread T2 to look explore further into each such page $12_n$. If thread T2 finds a relevant result it is inserted into the GhttpList (47b) for further exploration by the TScan thread.

The T3 thread of the present embodiment queries the backend server tables (40,48) to retrieve Template and Table URL information, as discussed hereinabove. Table URL refers to contents of the backend server (40,48) being an index of previous searches conducted by other users of client applications in accordance with the present invention (in particular being gathered through thread T5). A combination of the keyword, the URL address and location of the keyword on that URL (page number, etc) are stored and ranked appropriately by the backend server (40,48). The purpose of this is to have greater efficiency and relevancy for users of client applications of the present invention, if they are querying the same or similar combination of keyword and URL's when they conduct a search. If a match is found in the index (database 40,48), then this information is inserted into the GhttpList (47b) to cause a crawl from that specific area/location of the website(s) 12 to be conducted. The web-crawler thus starts from that point onwards, so that rather than starting from a homepage, the web-crawler can move directly to a specific area/page $12_n$ where relevant content $12_n$ to a keyword is kept and has been found before by other users.

The Template URL information is stored on the backend servers (40,48) as Table URL (again, through thread T5). The purpose of the Template is to store the form and/or submit template of a particular website(s) $12_n$ that a user has searched. This feature enables a subsequent web-crawler to be given an "understanding" of the website $12_n$ in question on how to search that particular site $12_n$ more efficiently. Specifically, this Template enables the web-crawler to "submit" a keyword to the website $12_n$ without needing to identify the existence of the "submit field" from first principles.

The T3 thread is called from the T0 thread (as was described with reference to FIG. 4b), and itself executes the T2 thread. The T3 thread is used to pass additional information that can assist when a new search starts, by checking the backend server (40,48) for information to assist in efficiently locating information on that particular site $12_n$ from Template URL and Table URL.

The T4 thread of the present embodiment is executed when a stop command is issued. T4 then stops all remaining threads from continuing further searching. The T4 thread is called from the TScan, or major thread crawler, and does not execute any other threads. The T4 thread is thus used to clean up any threads and components that are still running or have been placed in a queue.

The T5 thread sends relevant data retrieved by threads T1 and T2 back to the backend server (40,48) to index. As discussed above this builds Template and Table URL information, which is checked by thread T3, and used to assist subsequent searches. The type of information that is sent to the backend servers (40,48) by thread T5 may include, but is not limited to: Table URL which includes alinks with the relevant keyword within them and page $12_n$ locations; and/or, Template URL of that site $12_n$, setting out how all the components/crawlers initially searched that site $12_n$, so as to be more efficient when searched again by another user in future.

The purpose of the T5 thread is thus to make the live search process of the present invention faster and more efficient for the web-crawlers (e.g. threads T1, T2, etc), if the particular site $12_n$ has been searched before by other client application search tools in accordance with the present embodiment. Therefore, this immediately gives such a community of client-side web-crawlers a better understanding of the particular site $12_n$, such as: how it is internally arranged and interconnected; how it allows itself to be searched; and, what keywords were searched for in the past on this site $12_n$ and results that were returned. Thus, a community of users will contribute to a centralised database (40,48) which is based on the users' own searches. By collecting data from many users, each user becomes somewhat like a web-crawler, allowing a move away from requiring many thousands of machines performing dedicated repeated web-crawling tasks. Instead, this feature allows many such users to help other users in finding results that are relevant to them. The T5 thread is called from the TScan thread when a function send-to-server is called. The T5 thread does not call on any other threads.

The T6 thread is responsible for collecting, ranking and displaying the results that are found by the other threads conducting the Internet $14_n$ search. In this embodiment, thread T6 updates displayed results in predetermined intervals, for example, at least every 2.5 seconds, on the live search engine GUI 16 for the user to see the progress of results returned by ongoing live-crawling. Thread T6 also sorts the appropriate ranking on the GUI 16 for the user. As can be seen in FIGS. 7d & 7e, results displayed within live search engine GUI's 16 can be displayed in any suitable order or relevancy (e.g. as an ascending list as shown in FIG. 7d), or may be displayed in 'groups' (see, for example, FIG. 7e) by selecting the appropriate display button 34c (e.g. 'myResults' or 'myGroups' as shown in FIGS. 7d & 7e). T6 is called from the TScan thread on a timer thread that calls and executes the T6 thread. The T6 thread does not execute any other threads.

In accordance with the present invention, results that are collected are constantly being displayed and ranked (by thread T6) in a clearly defined order of ranking, and are displayed on the end user's computer 18. As can be seen in FIGS. 7d & 7e, live results that are displayed (within display results areas 34 of GUI's 16) back to the end user carry additional information such as other links that also exist on the relevant pages $12_n$ that have been found, which may assist the user in navigating around the page or site $12_n$ that has the information that is of interest. Further information could of course also be returned including, but not limited to, the number of hosts with matching search results, etc.

After a search is stopped or completed overall (such as when thread T4 stops all threads), the T7 thread proceeds to the sites $12_n$ of the relevant results appearing on the GUI 16 (alinks, etc) to retrieve further descriptions from those sites $12_n$. This enables more detail to be displayed within the live search engine facility GUI 16. This thread (T7) obtains such information for say, the top 30 results only (or any other suitable amount of sites $12_n$), and carries out this task while the user is still presented with the existing alink results displayed within their GUI 16. Thus, even while waiting for such descriptive information to be retrieved, the user can still review the alinks results list (within results display area 34), and select and click-through to those results, as desired. Thread T7 also checks whether each particular result is a 'dead-link', and if so notifies the user accordingly. Thread T7 is called from the main thread (GUI 16) once a search has completed and does not execute other threads.

Throughout the drawings various text boxes "A" are provided to illustrate that the various combined processes performed by the client application of the present invention, and/or its individual threads, are performed over and over, in multiple, simultaneous occurrences, as necessary.

In order to provide a better understanding of the preferred operation of the live search engine facility of the present invention, and its major individual threads or processes (e.g. T0 to T1, and TScan), reference will now be made to the flow diagrams shown in FIGS. 5 to 6i.

Figure 5:
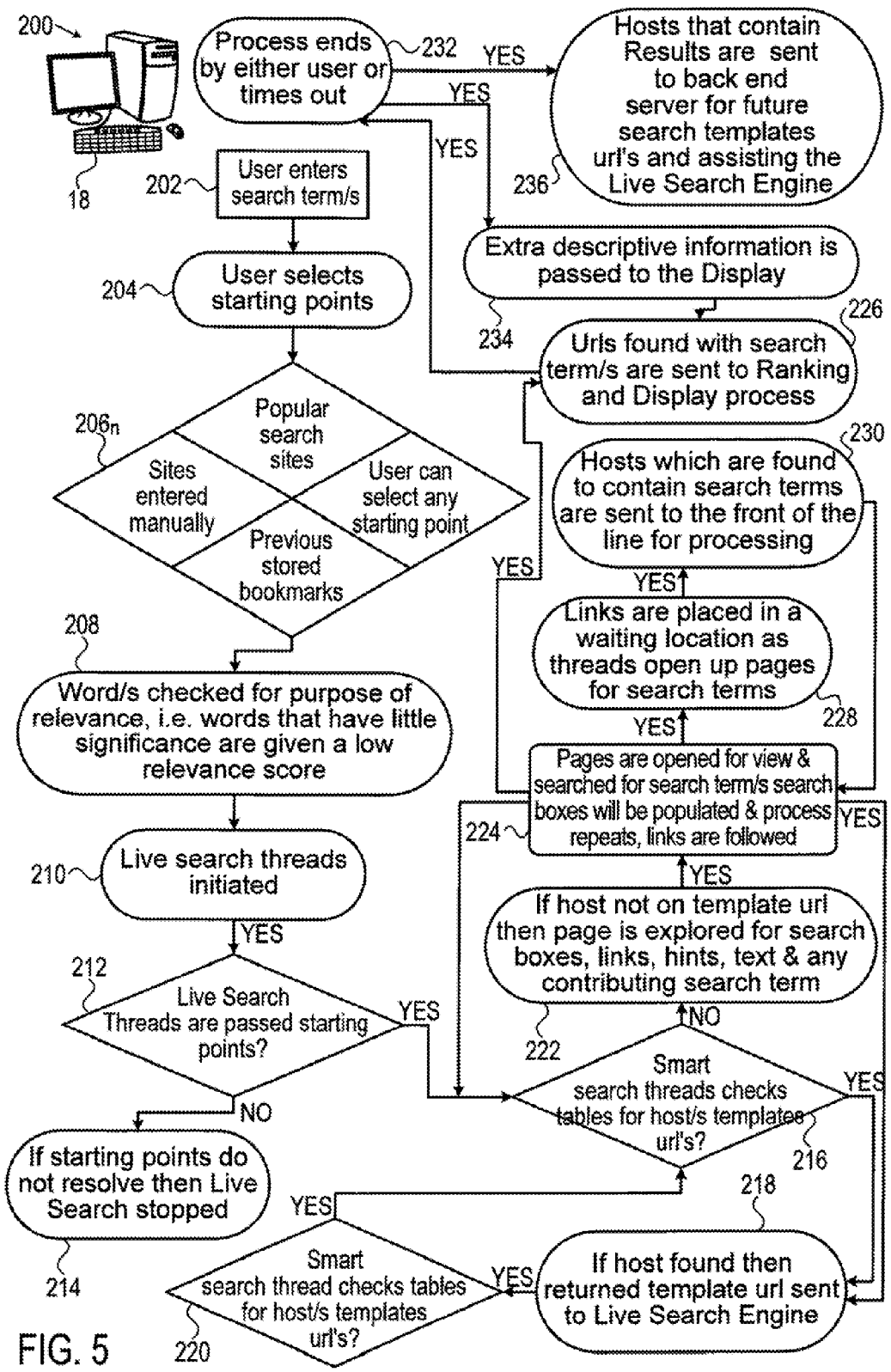
FIG. 5 is a flow diagram illustrating one embodiment of a method for searching network content, which is suitable for use with the embodiment of FIG. 1.

In FIG. 5 there is shown a flow diagram which illustrates a preferred method 200 for searching the Internet $14_n$ in accordance with the invention. Method 200 of FIG. 5 is suitable for use with system 10 of FIGS. 1 to 4b. It should be understood that the embodiment provided in FIG. 5 only illustrates one way in which a live Internet $14_n$ search may be performed in accordance with system 10. Many other methods (not shown) may be utilised to achieve the same or similar result and as such the present invention is not limited to the specific example provided.

Method 200 of FIG. 3 will be described in conjunction with FIGS. 7a to 7e, which as described hereinabove illustrate exemplary GUI's 16 suitable for use with the invention. It should be appreciated that any suitable GUI 16 can be used depending on the application of system 10. Accordingly, the present invention should not be construed as being limited to any of the specific examples provided.

Referring to FIG. 5, method 200 for searching the Internet $14_n$ starts at block 202, wherein a user must first enter their desired search terms (e.g. keywords—utilising search field 26 in GUI 16) in order to initiate a search. At block 204, the user is then prompted to select there desired starting points which may consist of: popular index search engines; sites entered manually; and/or, bookmarks, etc, as indicated by blocks 206n.

After selecting their desired starting points (or allowing an 'auto suggest' option to do so for them as previously defined) at blocks 206n, the user may submit their search by way of for example, clicking on the search button 28 shown in GUI's 16. Thereafter, at block 208, the live search facility may check the keywords entered for relevancy and/or word weight utilising information contained in the system server database(s) (40,48 in FIGS. 1 to 4b).

After the word weight, etc, is determined at block 208, the live search threads (e.g. TScan, T0 . . . T7, etc) are initiated at block 210, and the selected starting points are passed to the appropriate threads at block 212 in order to start the live search process. If at block 212 it is determined that the desired starting points cannot be resolved, etc, the live search process ends at block 214—whereat an appropriate error message may be passed back to the users GUI 16 in order to advise the user of the error that occurred. If however, at block 212 the desired starting points were correctly resolved, method 200 continues at block 216 whereat the requested search (and associated starting points, etc) may be checked against previous search strategies and/or information stored in the server database(s) (40,48) in order to determine whether the live search process can be streamlined and/or improved by way of the appropriate knowledge of the results of previous searches. If at block 216 it is determined that previous search information representing the search now requested by a user is stored in the system database(s) (40,48), at blocks 218 & 220 the appropriate information is retrieved from the database(s) and passed on with the current search request for further processing.

If at block 216 it is determined that no previous search information is stored in the server database(s) (40,48), or after the appropriate information is retrieved from the database(s) (40,48) at blocks 218,220, method 200 continues at blocks 222 & 224, whereat the site(s) $12_n$ are searched in order to locate appropriate search avenues stemming from the starting points selected.

At block 224, search information located at this point may be passed back to blocks 216,218, for indexing on the server database(s) for future search purposes, e.g. to streamline or improve future searches utilising similar search strategies and/or information, etc.

If at block 224 URL's are found that contain the appropriate search terms, etc, at block 226 those URL's, etc, are passed to the appropriate thread (e.g. thread T6) in order to be ranked and then displayed within GUI 16. If at block 224 links are found within other sites $12_n$ that require further pages $12_n$ to be opened and viewed in detail, those links are passed to a queue, at block 228, ready to be investigated when resources are available (e.g. by thread TScan). Thereafter, at block 230, the links are passed back, and explored in detail, at block 224, and then passed to block 226 for ranking and display, as before. This process continues until a desired amount of results are obtained (e.g. until a time-out occurs), or until the user chooses to end the search process at block 232.

Until such time that the search process ends at block 232, method 200 may continue to retrieve further (more detailed) information relevant to the results located—as represented by block 234 which shows that further information can be retrieved as need be and then passed back to block 226 for ranking and display, etc (by way of, e.g. thread T6).

At block 236, preferred method 200 may also index (or save) results obtained (or information associated therewith) in server database(s) (40,48) for future use as hereinbefore described.

In FIGS. 6a to 6i, there is shown flow diagrams which illustrate preferred methods 300, . . . , 1100 of operation of the T0 to T7, and TScan, threads of the present invention. It will be appreciated that the embodiments provided in FIG. 6a to 6i only illustrates one way in which the various thread may operate in accordance with the invention. A person skilled in the relevant art will appreciate alternatives means of operation of these threads, or minor modifications relating thereto, and as such, the present invention should not be construed as limited to the specific examples provided.

Figure 6A:
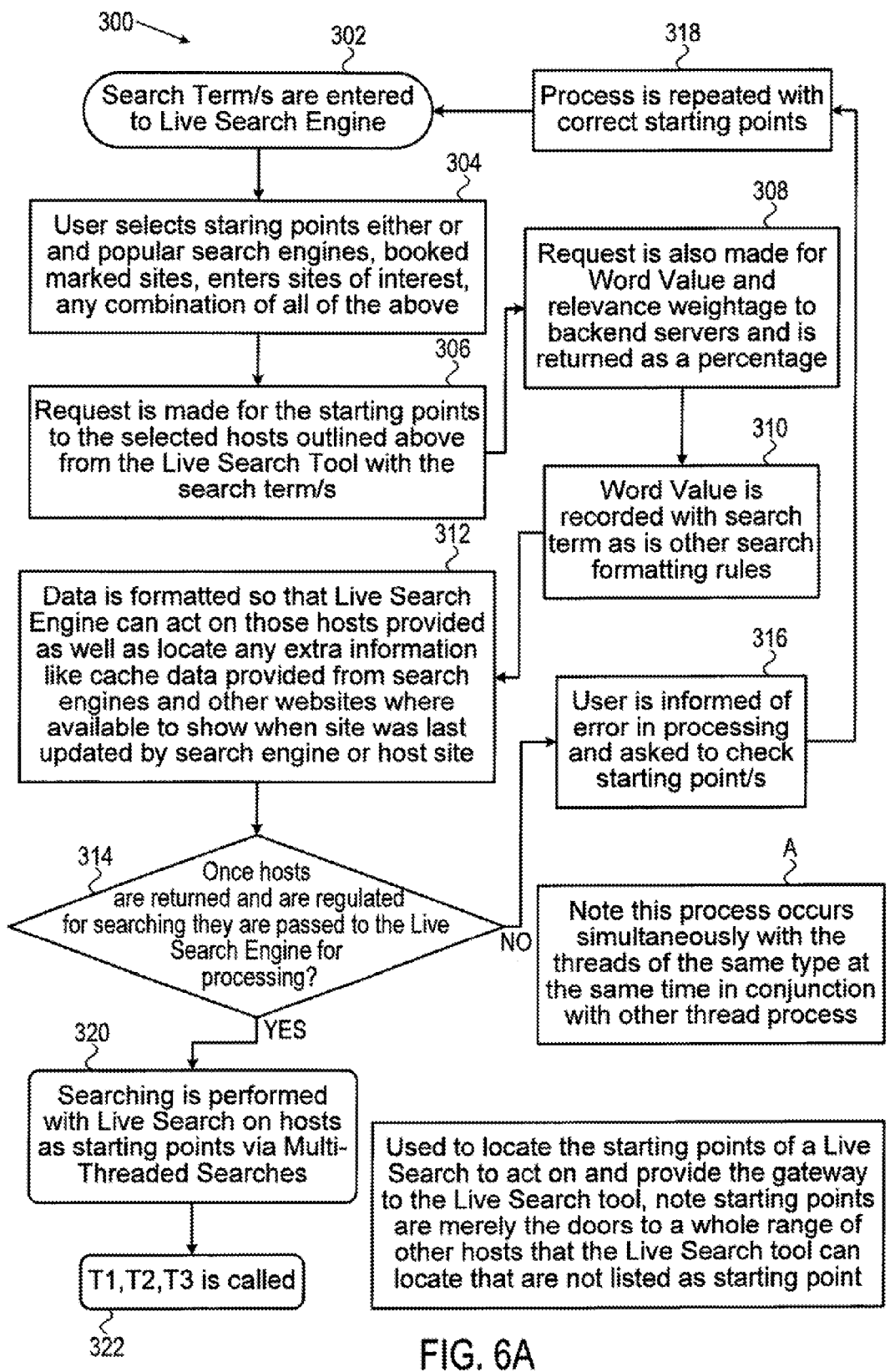
FIGS. 6a to 6i are flow diagrams illustrating preferred embodiments of methods of operation of the threads T0 to T7 and TScan shown in the embodiment of FIG. 1.

In FIG. 6a it can be seen that preferred method 300 of operation of thread T0, starts when a user initiates a search at block 302 by way of entering their desired search terms (e.g. keywords) utilising, for example, search field 26 provided within GUI 16. Then at block 304, the user is prompted to select there desired starting points (e.g. popular search engines, sites entered manually, etc).

At block 308, method 300 continues by checking word relevancy, etc, as need be, and then at block 310 passes the search term and added word weight information to block 312—whereat the search request data is formatted so that the live search engine facility can act of the hosts provided. At block 312, extra information, e.g. time stamp or cached information, etc, may also be obtained if the starting points selected by the user (at block 304) consisted on an index-type search engine (e.g. Google, or the like).

At decision block 314, a check is made to see whether the hosts can be resolved, and if they can't, method 300 continues at block 316 wherein an error message is generated and displayed to the user (by way of GUI 16)—and—the user is prompted to enter accessible or correct starting points at block 318. Thereafter, method 300 starts again at block 302 as before.

If at decision block 314, the hosts were resolved correctly, method 300 continues at blocks 320 & 322, wherein further processes of the live search facility are initiated as necessary (e.g. threads T1, T2, T3 are called at block 322).

Figure 6B:
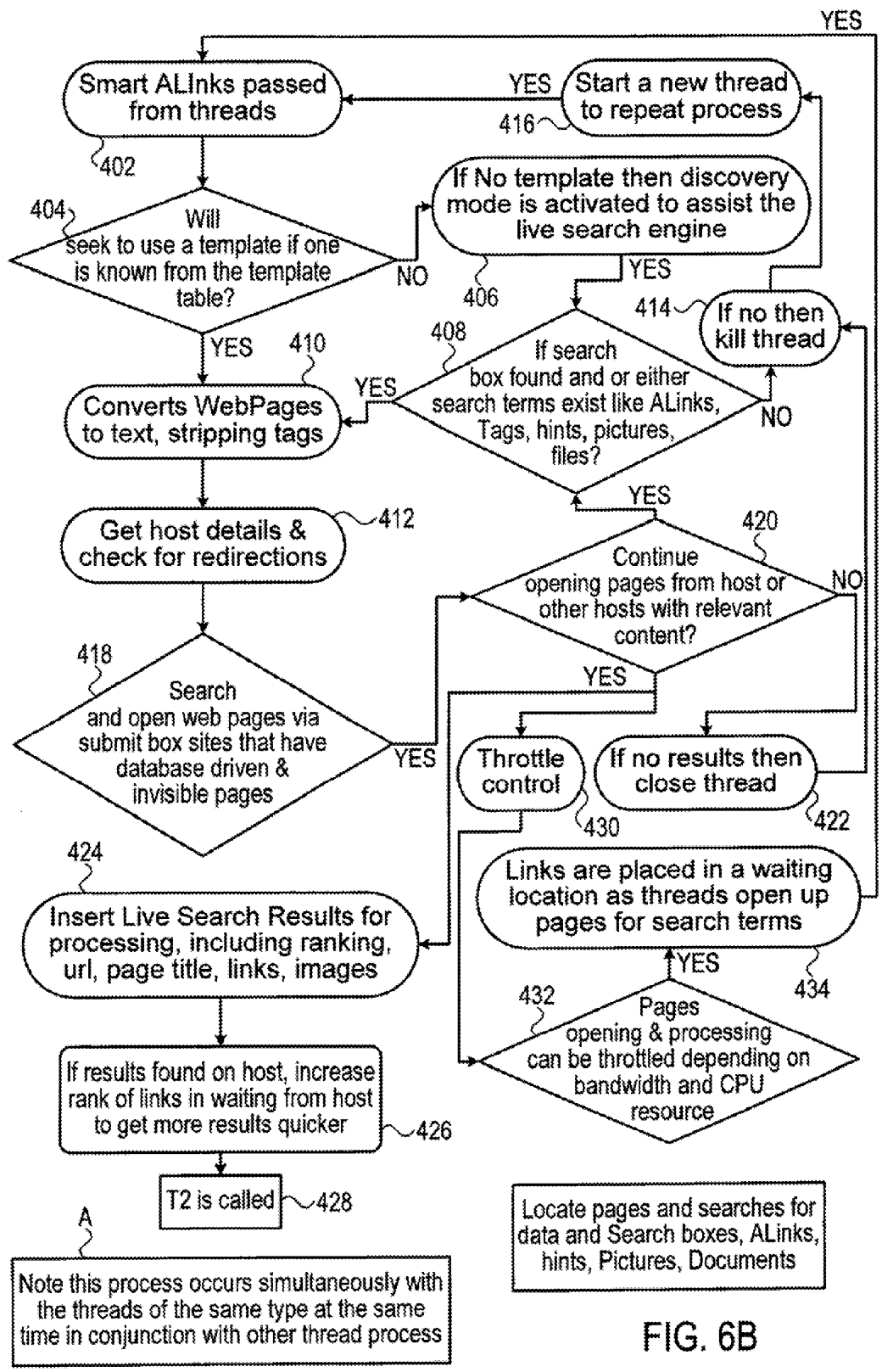

In FIG. 6b it can be seen that preferred method 400 of operation of thread T1, starts at block 402 when alinks are passes to this thread by other threads. Thereafter, at decision block 404, method 400 attempts to utilise a template if one is known from the template table stored in server database(s) (40,48). If at block 404 it is determined that no template is available, method 400 continues at blocks 406 & 408, whereat a discovery mode of the live search engine facility is initiated (block 406) and then the alinks are investigated further to determine if they contain additional desired information (e.g. search boxes, tags, hints, etc).

If, however, at decision block 404 it was determined that an appropriate template is available, or if at decision block 408 additional desired information was located, method 400 continues at block 410—whereat thread T1 converts the website $12_n$ to text and/or strips tags, etc, for further processing at block 412 (described below).

If back at block 408 it was determined that no additional desired information was available, method 400 continues at blocks 414 & 416, wherein the current thread process is killed (block 414), and a new thread is started (block 416) before the process is repeated at block 402 as before.

At block 412, the host details are obtained and checked for redirections. Then at block 418 the search process is continued and the websites $12_n$ are opened/explored for further search avenues and/or information. Thereafter, at block 420, the websites $12_n$ are continued to be opened/explored as need be until such time that no further results are obtainable (see block 422)—at which time the current thread is killed (block 414), a new thread started (416), and the process is repeated as need be (at block 402), as previously described.

Whilst results are continually being obtained at block 420, preferred method 400 passes relevant information back to block 408 (for future use), and also passes those results to other threads (e.g. T6) for ranking and display, etc, at block 424. After obtaining results at block 424, method 400 continues at block 426 whereat the ranking of a particular host having relevant results made be increased for current/future display purposes. Method 400 then concludes at block 428 by calling thread T2.

Also whilst results are continually being obtained at block 420, preferred method 400 may check the capacity of the user's computer 18 resources at blocks 430 & 432, and if at these blocks it is determined that the resources are stretched, at block 434 the alinks may be placed in a queue (or the process temporarily halted, etc) until further resources become available. Preferred method 400 may then repeat at block 402 as before.

Figure 6C:
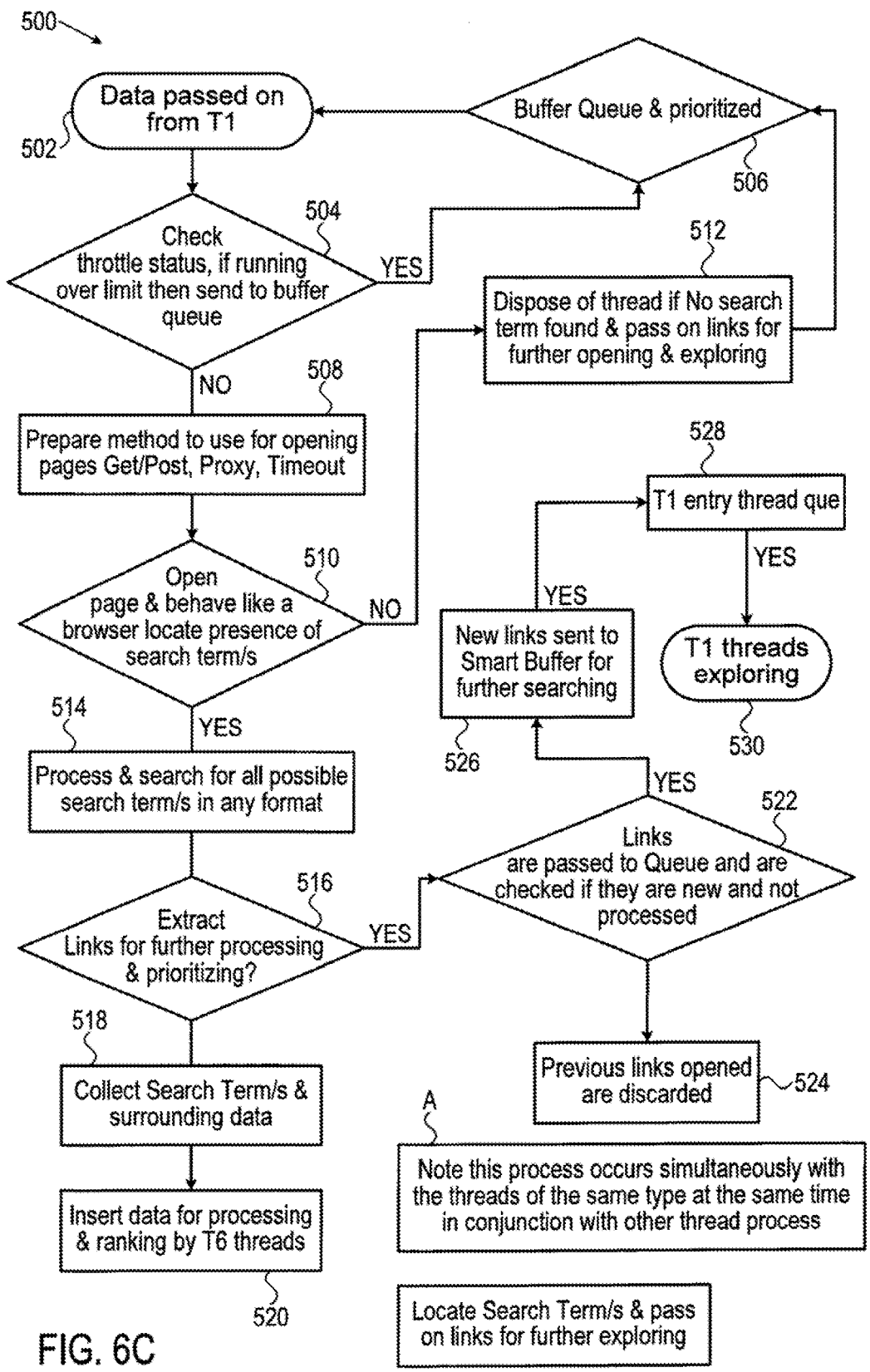

In FIG. 6c it can be seen that preferred method 500 of operation of thread T2, starts at block 502 whereat data has been passed on from thread T1. Thereafter, at decision block 504, method 500 checks the capacity of the available computing resources, and if it is determined that the resources are at capacity, at block 506 the data passed on from thread T1 is placed in a buffer que and prioritised until such time that the appropriate resources become available—whereat, the method 500 commences again at block 502 as before.

If at decision block 504 it is determined that the appropriate resources are available, method 500 continues at block 508 whereat an appropriate strategy is prepared for opening pages 12$_n$, post proxy, etc. Thereafter, at decision block 510 the page(s) 12$_n$ are opened and the thread behaves like a browser in order to locate the presence of search terms. If no search terms are found at block 510, method 500 continues at block 512 wherein the present thread is disposed of and the links are passed to the buffer que (at block 506) for further opening/exploring as necessary (i.e. method 500 repeats at block 502—if necessary). If search terms were located at block 510, method 500 continues at block 514 whereat all possible search terms are located in any suitable format. Thereafter, at decision block 516, method 500 extracts links for further processing and prioritising, and passes the results obtained at block 514 to blocks 518 & 520—to be collected (block 518), then passes to thread T6 for ranking and display within GUI 16 (block 520). Also, at block 516, the extracted links are passed to a que at block 522, whereat they are checked if they are new links (i.e. have not before been processed).

If at block 522, it is determined that the extracted links are not unique, then at block 524 those links opened and discarded. If, however, at block 522 it is determined that the extracted links are new, then those links are sent to a buffer at block 526 for further processing, then at blocks 528 & 530, they are passed from thread T2 back to T1 for further exploring as necessary.

Figure 6D:
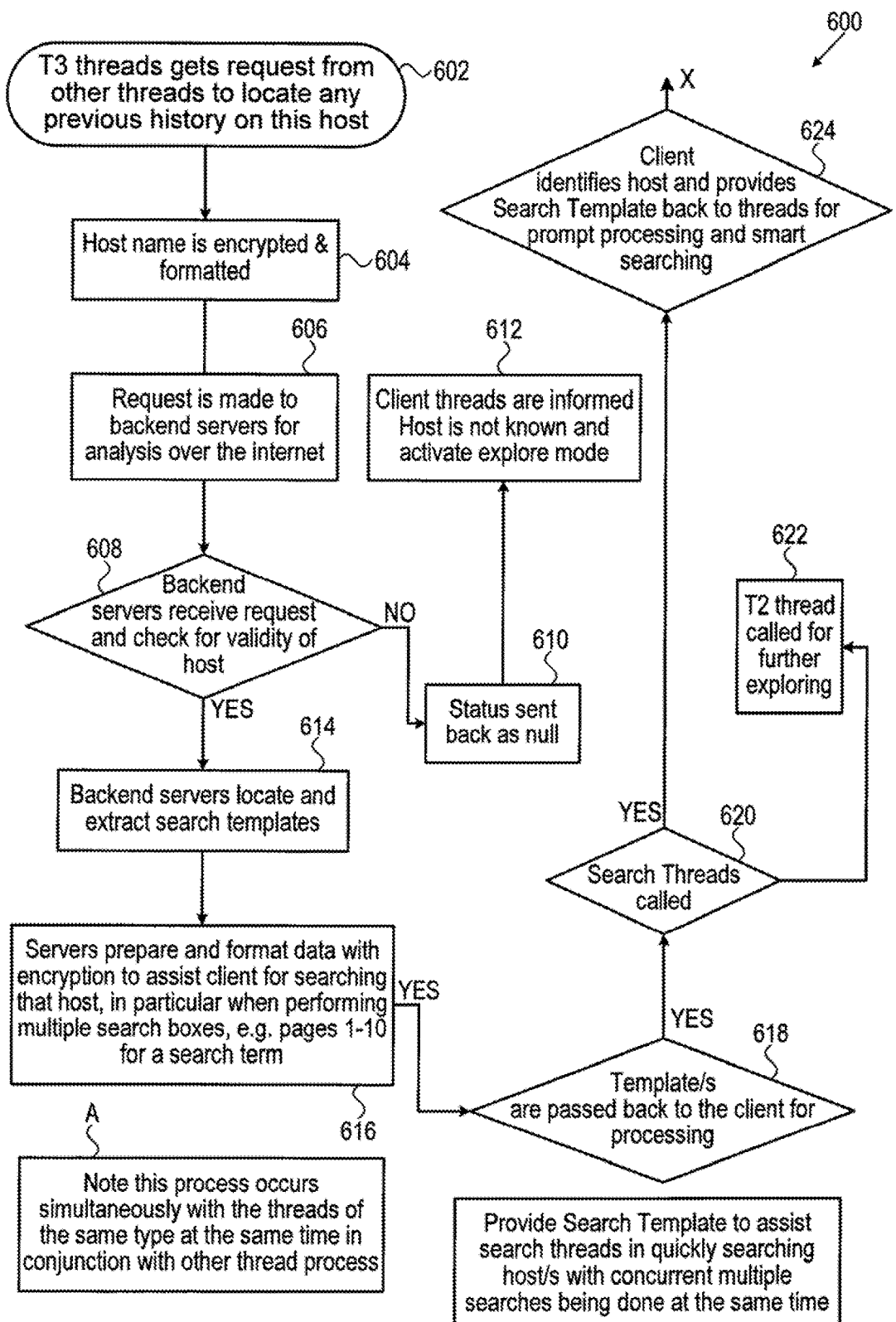

In FIG. 6d it can be seen that preferred method 600 of operation of thread T3, starts at block 602 whereat a request has been passed on to thread T3 from other threads requiring the T3 thread to investigate and locate previous history of a particular host. Thereafter, at block 604, method 600 continues as block 604 whereat the host name is encrypted and formatted as necessary, before a request is passed to the server database(s) (40,48), via the Internet 14$_n$, at block 606, so that host information may be checked against stored information in the database(s) (40,48) at block 608.

If at block 608, no information regarding that host is located in the database(s) (40,48), method 600 continues at blocks 610 & 612, whereat the host status is set as 'null' (block 610) and that status is sent back to the other threads (at block 612). If, however, at block 608, host information is in fact located, at block 614 the appropriate host information is extracted from the database(s) (40,48), that information is then prepared and formatted (encrypted, etc) at block 616 for transmission back to thread T3 for further processing at block 618.

Thereafter, at block 620, the search threads are called, e.g. thread T2 is called at block 622, and then, at block 624, method 600 identifies the host and provides search template information back to other threads for processing and further searching as indicated by arrow x.

Figure 6E:
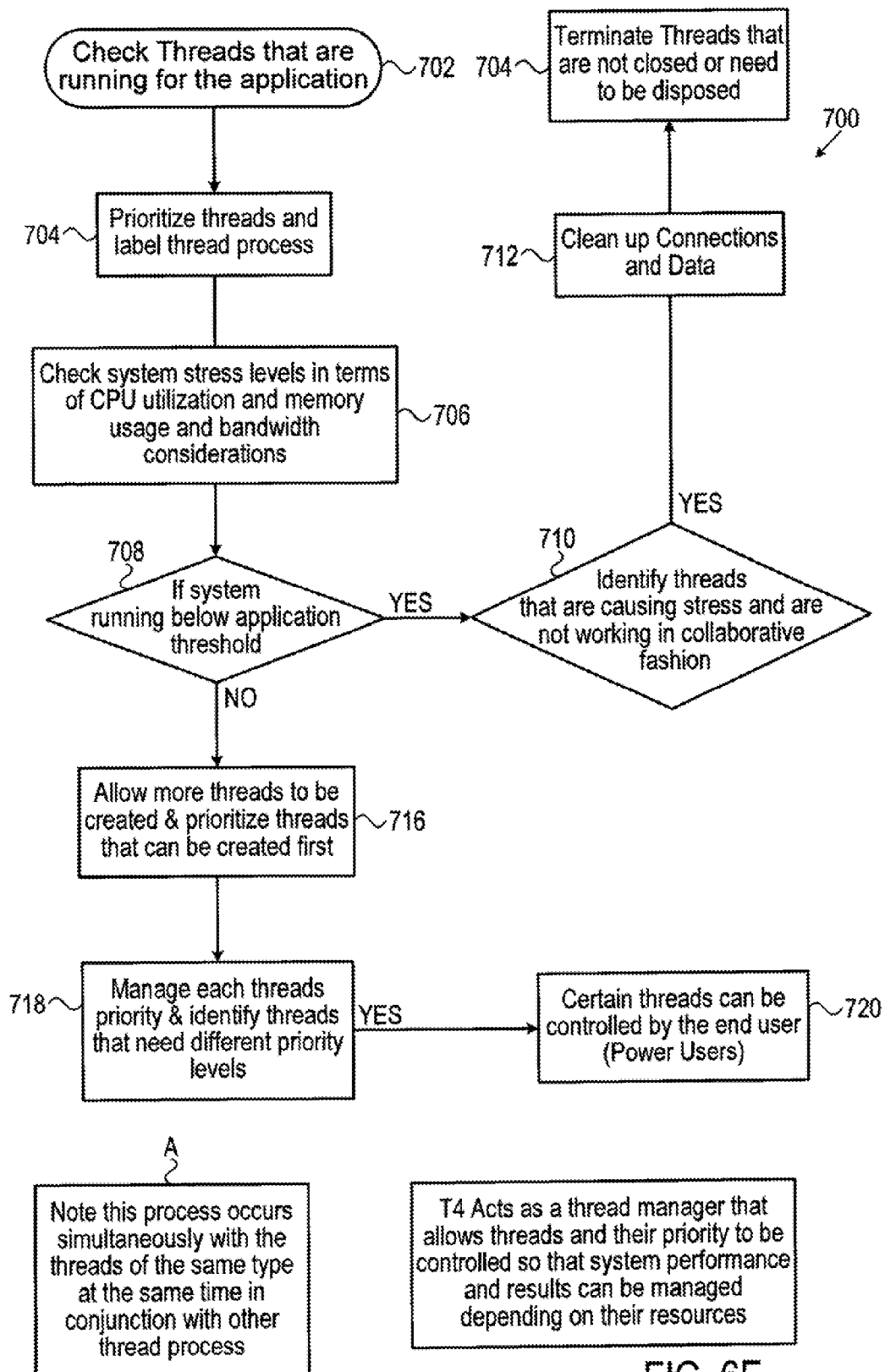

In FIG. 6e it can be seen that preferred method 700 of operation of thread T4, starts at block 702 whereat this thread checks what other threads are running. Then, at block 704, any running threads are prioritised and labelled as need be. Thereafter, at blocks 706 & 708 the available computing resources are checked to see if they are overloaded, etc. If, at decision block 708, it is determined that the computing resources are running below a predetermined threshold, method 700 continues at block 710, whereat thread T4 determines which thread(s) are draining the available resources, and then at blocks 712 & 714, those thread can be cleaned up (block 712) or terminated (714) as need be. If, however, at block 708, it was determined that the available resources are running above the predetermined threshold, at block 716, method 700 allows more threads to be created, and prioritises that can be created first. Thereafter, at block 718, method 700 may monitor and manage the running threads based on priority levels. Block 720, of preferred method 700, demonstrates that certain users (e.g. power users) may be able to manage and control the running threads manually, if desired.

Figure 6F:
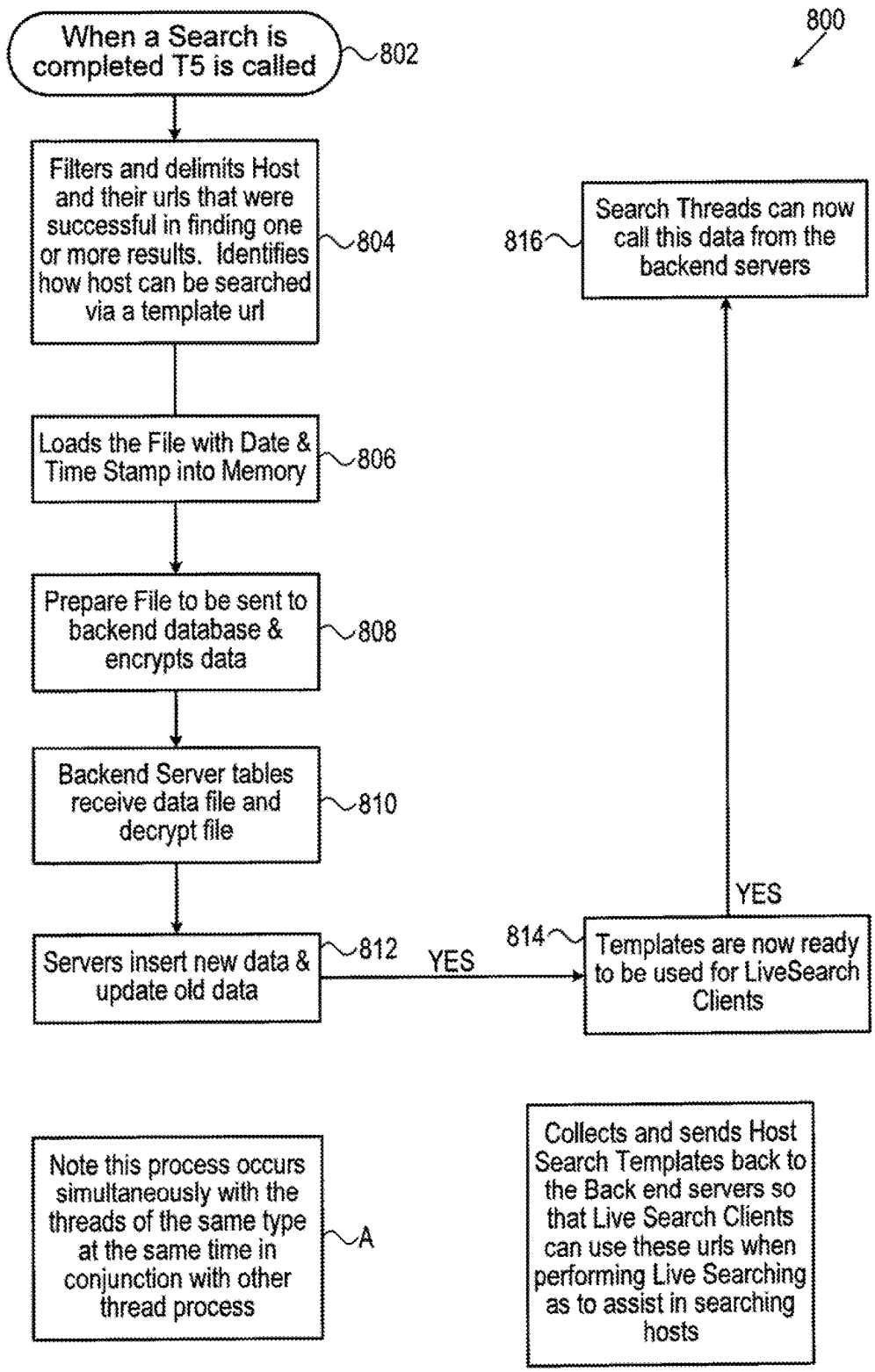

In FIG. 6f it can be seen that preferred method 800 of operation of thread T5, starts at block 802 when a search is completed. Then, at block 804, method 800 continues whereat successful hosts, and there URL's, are filtered and delimited, and thread T5 identifies how hosts can be searched via template URL, etc. Thereafter, at block 806, the host data is loaded into memory and associated date and time stamp information is obtained, before a data file is prepared at block 808, ready for transmission to the backend server database(s) (40,48).

Block 810, represents the receipt of the data file at the backend server, at which time same is unencrypted (if necessary), before being stored in server database(s) (40,48) at block 812. Block 812 also demonstrates that the backend server may determine if old related information is to be updated, and if so, the new information received will replace the old information previously stored. Then, at blocks 814 & 816, the new (or updated) template information is made available to the search threads as necessary.

Figure 6G:
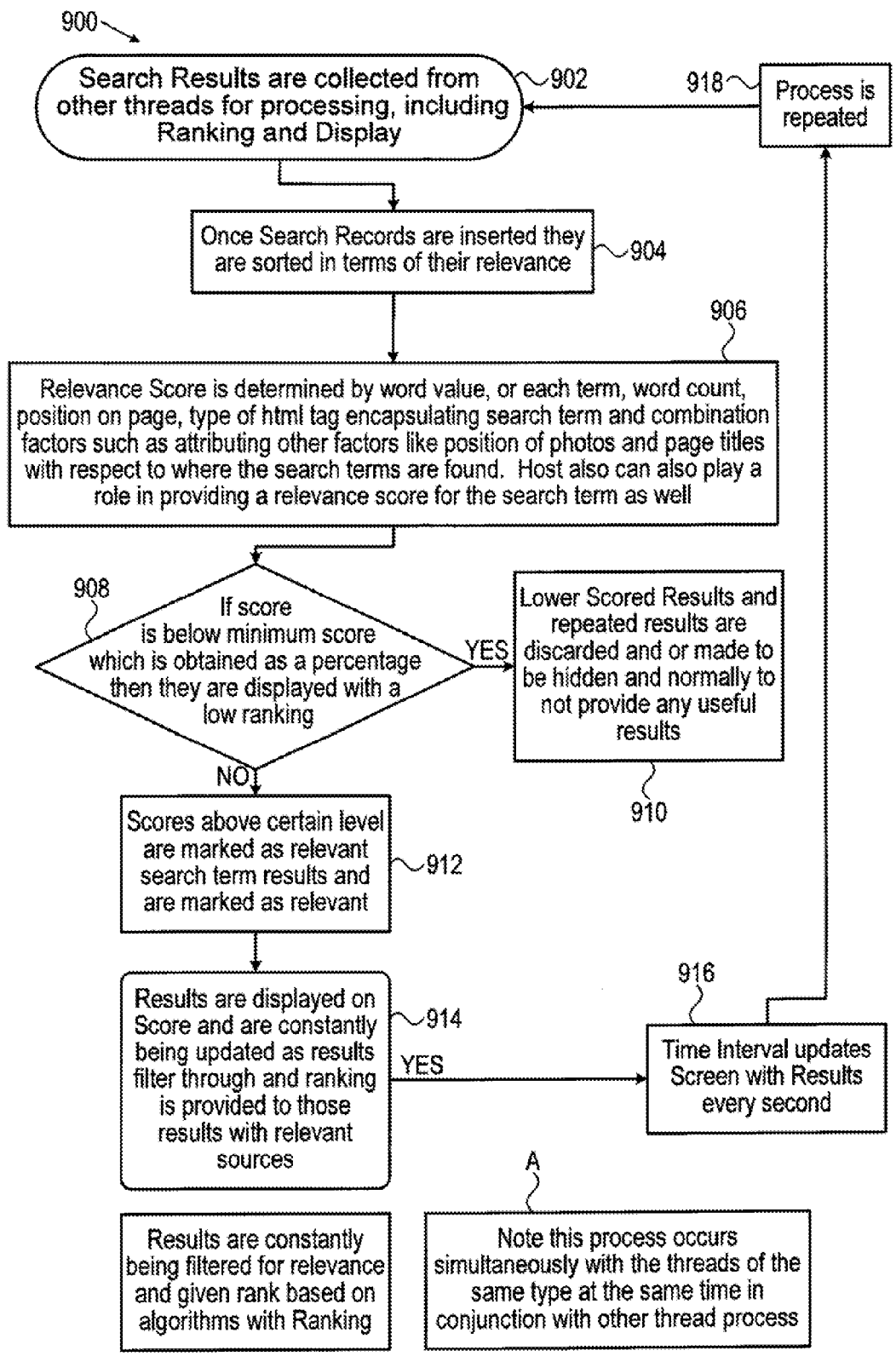

In FIG. 6g it can be seen that preferred method 900 of operation of thread T6, starts at block 902 whereat search results are collected from other threads for processing, including ranking and display within GUI's 16.

At block 904, the received search results are sorted for relevancy. Then, at block 906, a relevancy score is allocated to the search results based on any of a variety of criteria, as for example, word value, word count, host ranking, etc. Thereafter, at decision block 908, a check is made to see if the relevancy score of search results determined at block 906 is below a predetermined threshold. If at block 908, it is determined that the search results do in fact have a score that is below the predetermined minimum, method 900 concludes at block 910, whereat the results having low scores may be repeated, discarded, or hidden given that they would normally not provide useful results to a user. If, however, it was determined at block 908, that the search results have a score above the predetermined minimum, at block 912, those results are marked as having relevant search terms, and are then, at block 914, displayed within a GUI 16 based on their score, etc. Block 914, and further blocks 916 & 918, also demonstrates that the displayed results may be updated or refreshed at predetermined intervals as new results are received and processed by thread T6.

Figure 6H:
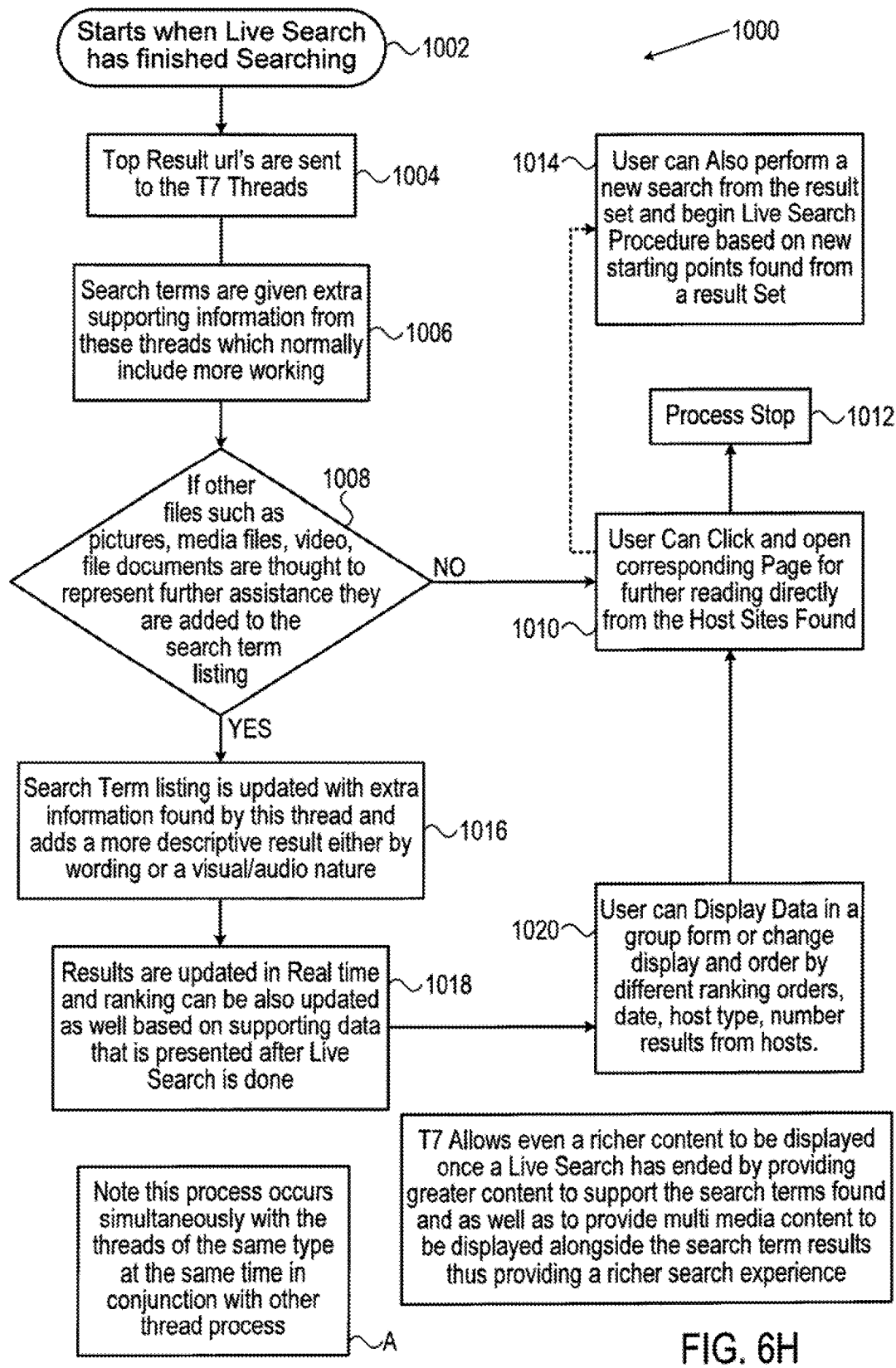

In FIG. 6h it can be seen that preferred method 1000 of operation of thread T7, starts at block 1002 when a live search process is finished. Then, at block 1004, the most relevant results URL's are retrieved and passed to block 1006 whereat search terms are given extra supporting information would could include more wording, etc. Then at decision block 1008, a check is made to determine whether any other files (e.g. image files, pdfs, video files, etc) are may be of further assistance to a user based on the search previously performed. If at decision block 1008, it is determined that no other files are likely to be of further assistance to a user, method 1000 continues at block 1010, whereat the user may simply click on (i.e. explore) the results previously displayed within their GUI 16. Then, at blocks 1012 & 1014, method 1000 may conclude if the user is happy with the existing results displayed (block 1012), or may initiate another live search process (at block 1014), if desired by the user, utilising the results previously obtained as future starting points. If, however, at block 1008, it was determined that there is files, etc, that are likely to be of further assistance to the user, method 1000 continues at block 1016, whereat the search term listing is updated with extra information found by this thread (T7), and that additional information is displayed to the user within their GUI 16.

At block 1018, the further search results are updated in real-time and ranked accordingly by way of, for example, thread T6 of the present invention. Thereafter, at block 1020, the user may manipulate the display of the results within their GUI 16, by way of, for example, grouping the results, changing the order of the ranked information, etc. Method 1000 then continues at block 1010, as before, before either ending at block 1012, or continuing to initiate a new search based on the results obtained (at block 1014).

Figure 6I:
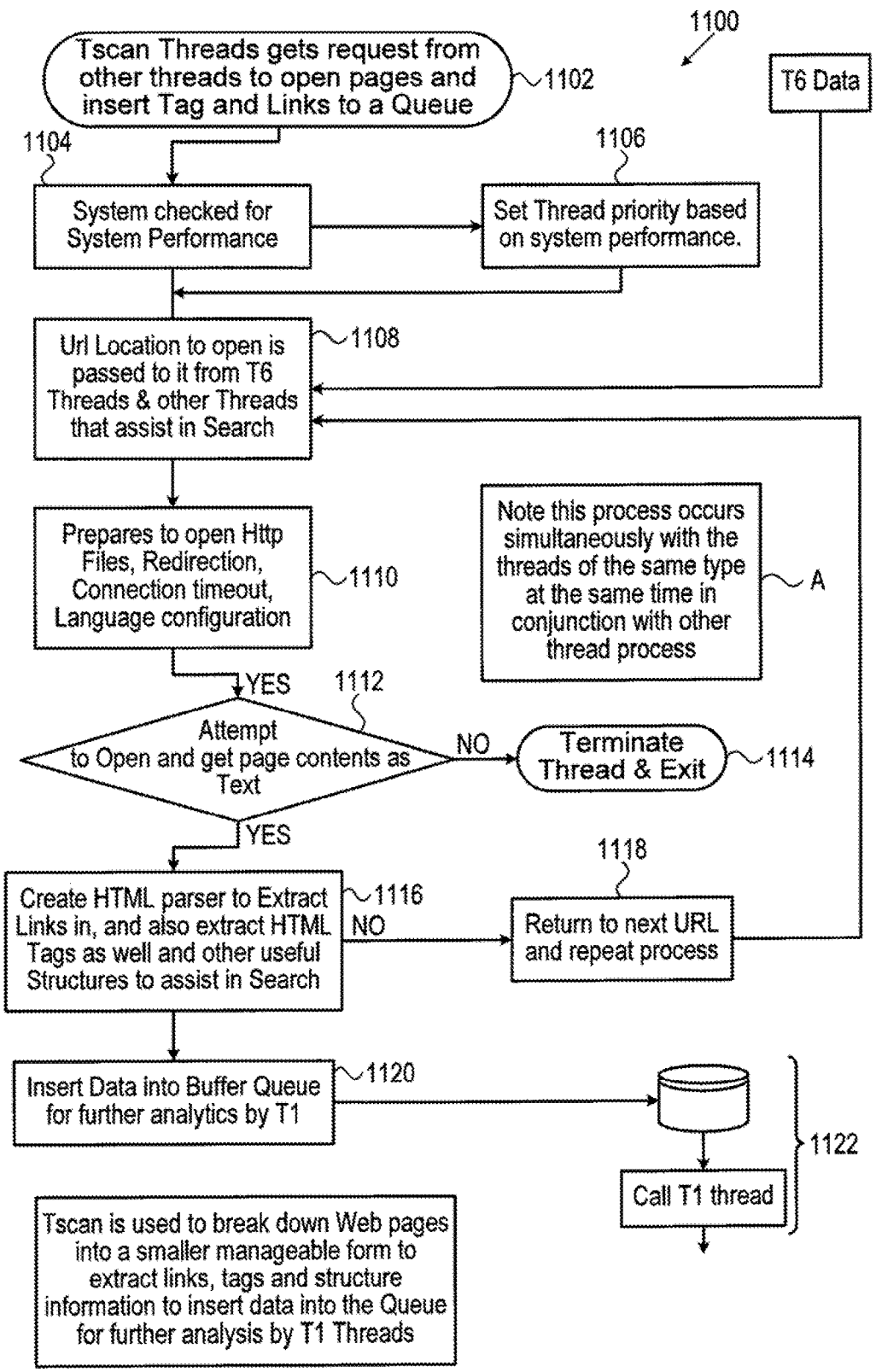

Finally, in FIG. 6i it can be seen that preferred method 1100 of operation of thread TScan, starts at block 1102, whereat the TScan thread receives requests from other threads to open pages $12_n$, and to insert tag, links, etc, into a queue. Then, at block 1104, method 1100 checks the availability of system resources, and if it is determined that they are low, at block 1106, thread priority is set and method 1100 awaits available system resources before proceeding further. If, however, at block 1104, it is determined that the appropriate system resources are available, method 1100 continues at block 1108, whereat the URL location to open is passed to this thread (TScan) by other system threads (e.g. thread T6). Then, at block 1110, method 1100 prepares to open the relevant http files, determines any redirections and/or language configurations, etc.

At decision block 1112, method 1100 attempts to open and retrieve the relevant page content $12_n$. If at block 1112, the page content 12 cannot be opened, method 1100 concludes at block 1114, wherein the thread is terminated. If, however, it is determined at block 1112, that the page content $12_n$, can be opened, method 1100 continues at block 1116, whereat a html parser, etc, is created to extract the appropriate links, tags, etc, to assist with the searching process. If at block 1116, the process of extracting the appropriate links, tags, etc, is unsuccessful, then method 1100 continues at block 1118, where the next URL is obtained, and the method returns to block 1108 to repeat the process of TScan, as before. If, however, at block 1116, the process of extracting the appropriate links, tags, etc, was successful, method 1100 continues at blocks 1120 & 1122, whereat the obtained data is inserted into a buffer queue for further analysis by thread T1, which is called at block 1122.

Figure 8:
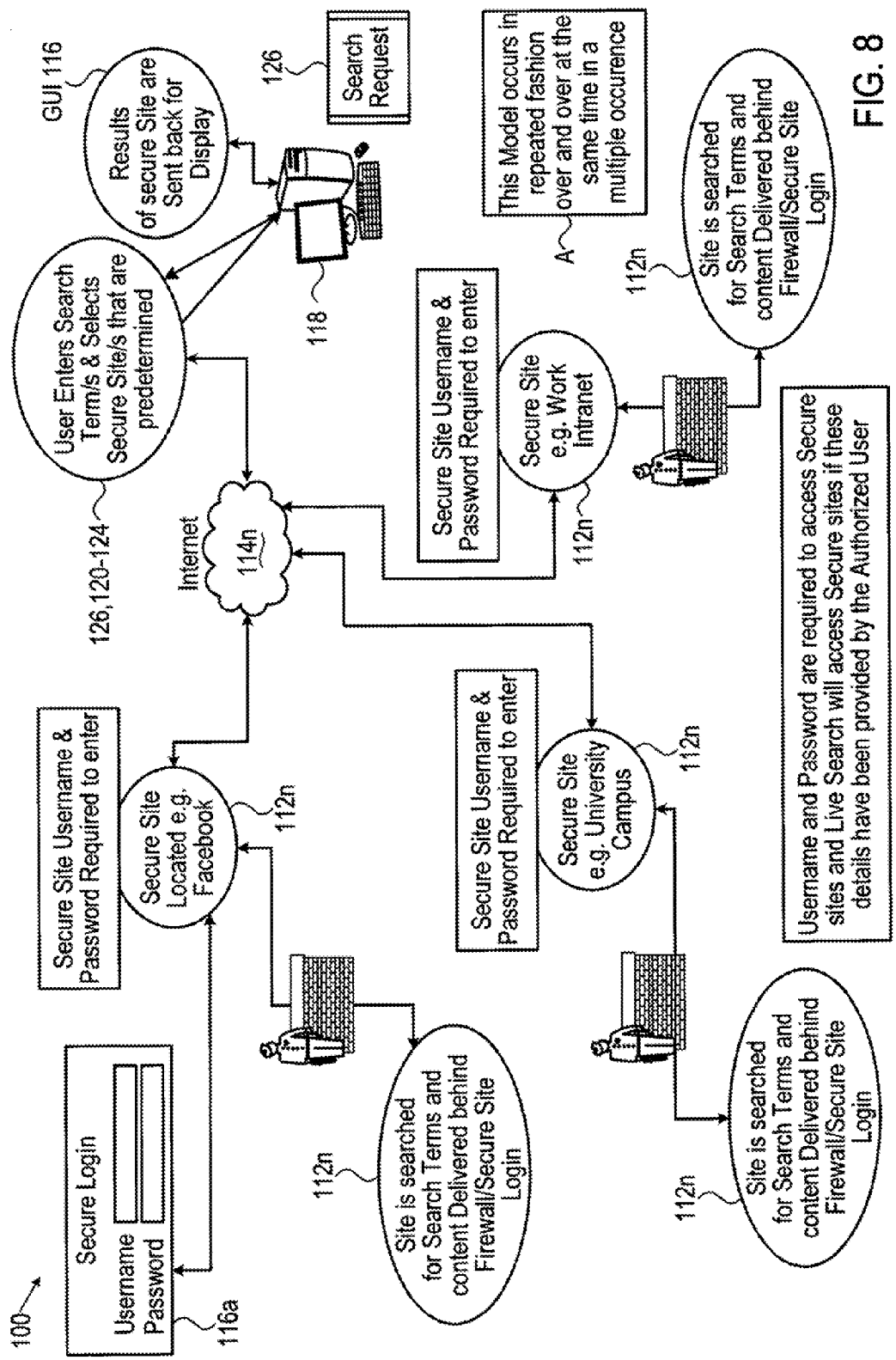

In FIG. 8 there is shown a further preferred embodiment of a system 100 for searching content $112_n$ available via a suitable communications network $114_n$, for example, 'secure' web content $112_n$ available via the Internet $114_n$ as shown. Like in the case of the preferred embodiment shown in FIGS. 1 to 7d, although this further preferred embodiment will hereinafter be described with reference to a system and/or method for searching the Internet $114_n$, it will be appreciated that same is not limited to that use only.

In FIG. 8, like reference numerals to those used to describe system 10 shown in FIGS. 1 to 7d will be used to define like parts of system 100.

System 100 of FIG. 8 operates essentially in the same fashion as that of system 10 of FIGS. 1 to 7d, but instead system 100 also includes the ability to search secure website $112_n$, i.e. sites $112_n$ requiring a username and password, or login, before same can be entered and viewed.

In FIG. 8, it can be seen that the client application (not shown) of system 100 is additionally able to pass login information to secure sites $112_n$, such that once permission to view the site(s) $112_n$ contents is granted to the users computer 118, the live search engine facility of system 100 is able to crawl its contents $112_n$ in real-time as hereinbefore described. In a preferred embodiment, users may be prompted to enter their login information into an appropriate 'secure login' GUI 116a after their starting points have been selected. In this way, users may retrieve search results from both secure and non-secure websites $12_n$ via a single search engine process (in real-time).

The present invention therefore provides an improved method and/or system for searching network content $12_n$, preferably the Internet $14_n$. When a request is provided to the live search engine facility of the present invention, either by way of a web-page request, or an application request, the facility looks at the request and makes decisions on what path(s) to take to start a real-time Internet $14_n$ search. The starting point(s) of the real-time search process can be determined by way of a plurality of possible scenarios, including, but not limited to: (a) starting points that are derived from a multitude of possibilities like popular websites $12_n$, a mixture of popular search results from both previous search results from other users, and, other index-type search engines. Results obtained from previous user's allow the live searching facility of the present invention to learn from others and make decisions that somewhat mimic human thinking since starting points can be ranked and used very effectively with such a feature. Starting points only provide the gateway to the inner pages that websites $12_n$ have, and that of other sites 12 that also linked to those sites, etc; (b) starting points for searching can also be directed to either a single site $12_n$ or a multiple mix of websites $12_n$. For example, if a user was looking for the latest on a particular topic and was aware of say four websites $12_n$ that contained relevant information on that topic, the live search engine facility of the present invention could search from those sites (e.g. start therefrom, and search onwards) and provide results based on the requested search topic. This would save considerable time, since it would otherwise take a substantial amount of time to find what results would be relevant to the search request if the search facility had to first sift through general search results in order to locate a relevant starting point; (c) starting points can also and quite often link off other starting points, thus giving a user a wide mix of results that normally would be passed, or overlooked, by regular index search engines. For example, if a user searched a website $12_n$ that sold a particular car and was actually looking for a particular set of wheels for that car, the live search facility of the present invention will not only search the specific car website $12_n$ concerned, but will also link to other sites 12$_n$ that the user may not be aware of, that could contain similar or relevant results based on the users search request, that may be linked to the initial car website 12$_n$. This type of searching allows a user to perform a 'community-like' search, which could provide a very powerful and rich search tool especially when it comes to searching for relevant material that co-exists on related websites 12$_n$; and/or, (d) starting points can also be derived from a user's own collection of bookmarks, or 'favourite' sites 12$_n$, thus making it very easy for that user to search within their regularly visited sites 12$_n$ in order to find relevant Internet 14$_n$ content 12$_n$.

As discussed at the outset of this description, page rankings, etc, can quite often hinder index-type search results, although the information may be there, it may not be retrievable (or could take a very long time to locate) based on the popularity algorithms, etc, used by these known search engine facilities. The live search engine facility provided by the present invention does away with complicated page ranking processes, and instead adopts the rational of locating and displaying relevant, up-to-date, results based on the starting points selected, and the search query submitted by a user.

The live search facility provided by the present invention essentially behaves like a user when searching the Internet 14$_n$, and provides a vast improvement in locating information since all searches are conducted in real-time, and all search results are a direct result from requests made to hosts themselves—i.e. the search process does not rely on index search results like conventional search engines, or meta-search engines. Whether hosts are determined or undetermined, the live search facility learns how sites are structured, and is able to search millions of websites 12$_n$ without any prior knowledge of those sites or their structure.

Finally, and in accordance with a further preferred aspect, as the live search facility of the present invention essentially acts in the same manner as a user stationed at their computer 18, the live search facility is able to search within secure site(s) 12$_n$, requiring a user name and password, since the search facility is further able to pass such information to the secure site(s) 12$_n$ as part of the search process. Hence, websites 12$_n$ such as Facebook, or university databases, etc, can be included as part of a live search performed in accordance with the present invention. This represents a significant improvement on known index-type search engines, since the web-spiders adopted by such search engine are not able to login and index secure site information.

While this invention has been described in connection with specific embodiments thereof, it will be understood that it is capable of further modification(s). The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

Finally, as the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and the appended claims. Therefore, the specific embodiments are to be understood to be illustrative of the many ways in which the principles of the present invention may be practiced.

Where the terms "comprise", "comprises", "comprised" or "comprising" are used in this specification, they are to be interpreted as specifying the presence of the stated features, integers, steps or components referred to, but not to preclude the presence or addition of one or more other features, integer, step, component to group thereof.

I claim:

1. A method of performing a live network search for currently available content, the method comprising the steps of:
   accepting a user search query at a computer connected to the network;
   in response to the user search query, identifying search origins comprising a network resource deemed of relevance to the user search query;
   retrieving and reviewing the contents of the search origin to identify the presence of one or more search avenues stemming from the search origin:
   perusing identified search avenues by retrieving the currently available content at the search avenues to identify search results to be returned by the computer in response to the user search query, perusing further comprising:
   a. identifying links and submission fields in the currently available content at the search avenue defining network locations to serve as new search avenues;
   b. prioritizing and/or disregarding search avenues based on search avenue relevance determined by look-up of relevancy information, and/or word weight tables;
   c. storing at a server the identified links and links to the submission fields with the search query that identified the search avenue and the prioritization information;
   repeating the processes of retrieving, reviewing and perusing in respect of network locations stemming from the identified search avenues.

2. The method as claimed in claim 1, wherein the network is the Internet, and the network content is web content and/or related web information, and wherein the network resource is an Internet resource.

3. The method as claimed in claim 1, wherein the user search query is submitted by way of any suitable Graphic User Interface (GUI).

4. The method as claimed in claim 1, wherein the search query is submitted by way of a software application embedded within or provided as a plug-in for a web-browser GUI.

5. The method as claimed in claim 4, wherein the software application is a client-side application.

6. The method as claimed in claim 5, wherein the search origins include links identified by the client-side application querying a database indexed search engine and utilising one or more results obtained therefrom as the search origin.

7. The method as claimed in claim 5, wherein the search origins include links identified by accepting a user input of a search origin from which the user wishes a search to commence.

8. The method as claimed in claim 1, further comprising the steps of displaying a live state of search results as perusing continues, and refreshing said results as continued live perusing yields additional relevant results.

9. The method as claimed in claim 8, further comprising the steps of acquiring and displaying a synopsis of each returned search result for review by the user, upon cessation of live perusing.

10. The method as claimed in claim 1, further comprising the step of communicating identified search results to the server for indexing and future retrieval.

11. The method as claimed in claim 10, further comprising the step of, before searching, checking whether a particular search origin or search avenue has been previously perused.

12. The method as claimed in claim 11, wherein said step of checking further comprises referring to search histories cached by the client-side application.

13. The method as claimed in claim 11 wherein said step of checking further comprises querying the server for indexed search information relevant to a search query input to the client-side application.

14. The method as claimed in claim 1, wherein said perusing further comprises:
   d. actuating an available submission field in the currently available content at the search avenue by automatically entering by the computer into the submission field an appropriate query related to the user search query,
   e. initiating the submission so that the search avenue generates dynamic network content responsive to the query entered into the submission field; and
   f. acquiring relevant dynamic network content in response to the submission.

15. The method as claimed in claim 1, further comprising accepting identification information from the user to access secure network information at the search avenue.

16. The method as claimed in claim 1, wherein the identified search origins include information from the server from previous live network searches performed by the user or other users.

17. A general purpose computing device connected to a network with a Graphic User Interface (GUI) application for performing a live network search for currently available content, said computing device being programmed with code for:
   accepting a user search query at the computer;
   in response to the user search query, identifying on the computer search origins comprising a network resource deemed of relevance to the user search query;
   retrieving and reviewing the contents of the search origin to identify the presence of one or more search avenues stemming from the search origin;
   perusing identified search avenues by retrieving the currently available content at the search avenues to identify search results to be returned by the computer in response to the user search query, perusing further comprising:
   a. identifying links and submission fields in the currently available content at the search avenue defining network locations to serve as new search avenues;
   b. prioritizing and/or disregarding search avenues based on search avenue relevance determined by look-up of relevancy information, and/or word weight tables;
   c. storing at a server the identified links and links to the submission fields with the search query that identified the search avenue and the prioritization information;
   repeating the processes of retrieving, reviewing and perusing in respect of network locations stemming from identified search avenues comprising a submission field.

18. The computing device as claimed in claim 17, wherein the network is the Internet, and the network content is web content and/or related web information, and wherein the network resource is an Internet resource.

19. The computing device as claimed in claim 18, wherein the GUI application is a web-browser application, and the search query is submitted by way of a software GUI application embedded within and/or provided as a plug-in for the web-browser GUI.

20. The computing device as claimed in claim 17, wherein said perusing further comprises:
   d. actuating an available submission field in the currently available content at the search avenue by automatically entering by the computer into the submission field an appropriate query related to the user search query,
   e. initiating the submission so that the search avenue generates dynamic network content responsive to the query entered into the submission field; and
   f. acquiring relevant dynamic network content in response to the submission.

* * * * *